United States Patent
Sakagami

(10) Patent No.: US 12,275,409 B2
(45) Date of Patent: Apr. 15, 2025

(54) TRAVEL CONTROL SYSTEM AND TRAVEL CONTROL METHOD

(71) Applicant: HONDA MOTOR CO., LTD., Tokyo (JP)

(72) Inventor: Kyohei Sakagami, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 603 days.

(21) Appl. No.: 17/530,666

(22) Filed: Nov. 19, 2021

(65) Prior Publication Data

US 2022/0169255 A1 Jun. 2, 2022

(30) Foreign Application Priority Data

Dec. 2, 2020 (JP) .................................. 2020-200560

(51) Int. Cl.
*B60W 30/18* (2012.01)
*B60W 10/04* (2006.01)
(Continued)

(52) U.S. Cl.
CPC ...... *B60W 30/18172* (2013.01); *B60W 10/04* (2013.01); *B60W 10/18* (2013.01);
(Continued)

(58) Field of Classification Search
CPC ........... B60W 30/18172; B60W 10/04; B60W 10/18; B60W 50/00; B60W 2050/0022; B60W 2510/0638; B60W 2510/081; B60W 2520/10; B60W 2520/105; B60W 2520/12; B60W 2520/26; B60W 2520/28; B60W 2520/30; B60W 2530/20; B60W 2552/35;
(Continued)

(56) References Cited

U.S. PATENT DOCUMENTS

2015/0360525 A1* 12/2015 Singh ..................... G01K 13/08
374/141
2017/0024617 A1* 1/2017 Yamaguchi ............ G01C 21/28
(Continued)

FOREIGN PATENT DOCUMENTS

JP 2018155696 A 10/2018
JP 2019031112 A 2/2019

OTHER PUBLICATIONS

Ouahi et al. (Simultaneous Observation of the Wheel Torque and Tire Force as well as the Vehicle Speeds) (Year: 2019).*

*Primary Examiner* — Elaine Gort
*Assistant Examiner* — Chanmin Park
(74) *Attorney, Agent, or Firm* — Armstrong Teasdale LLP

(57) ABSTRACT

A travel control system for a vehicle provided with a drive source, a wheel having a wheel body connected to the drive source via a power transmission member and a tire mounted on the wheel body, and a braking device for braking the wheel includes: an estimation unit configured to estimate a tire torsional stiffness and a road surface friction coefficient based on at least the rotation speed of the drive source, the rotation speed of the wheel body, the vehicle body speed, and the torque applied to the wheel body; and a control unit configured to control at least one of the drive source and the braking device such that the tire does not exceed an adhesion limit derived from the tire torsional stiffness and the road surface friction coefficient.

5 Claims, 9 Drawing Sheets

(51) Int. Cl.
*B60W 10/18* (2012.01)
*B60W 50/00* (2006.01)

(52) U.S. Cl.
CPC ..... *B60W 50/00* (2013.01); *B60W 2050/0022* (2013.01); *B60W 2510/0638* (2013.01); *B60W 2510/081* (2013.01); *B60W 2520/10* (2013.01); *B60W 2520/105* (2013.01); *B60W 2520/12* (2013.01); *B60W 2520/26* (2013.01); *B60W 2520/28* (2013.01); *B60W 2520/30* (2013.01); *B60W 2530/20* (2013.01); *B60W 2552/35* (2020.02); *B60W 2552/40* (2020.02); *B60W 2710/06* (2013.01); *B60W 2710/08* (2013.01); *B60W 2710/18* (2013.01)

(58) Field of Classification Search
CPC ......... B60W 2552/40; B60W 2710/06; B60W 2710/08; B60W 2710/18; B60W 40/068; B60W 10/06; B60W 10/10; B60W 10/16; B60W 10/184; B60W 40/064; B60W 2510/12; B60W 2520/125; B60W 2540/12; B60W 2540/18
See application file for complete search history.

(56) References Cited

U.S. PATENT DOCUMENTS

| | | | |
|---|---|---|---|
| 2020/0041284 A1* | 2/2020 | Liu | G06F 16/29 |
| 2020/0290625 A1* | 9/2020 | Berntorp | B60W 30/18172 |
| 2021/0094555 A1* | 4/2021 | Bajpai | B60W 40/105 |

* cited by examiner

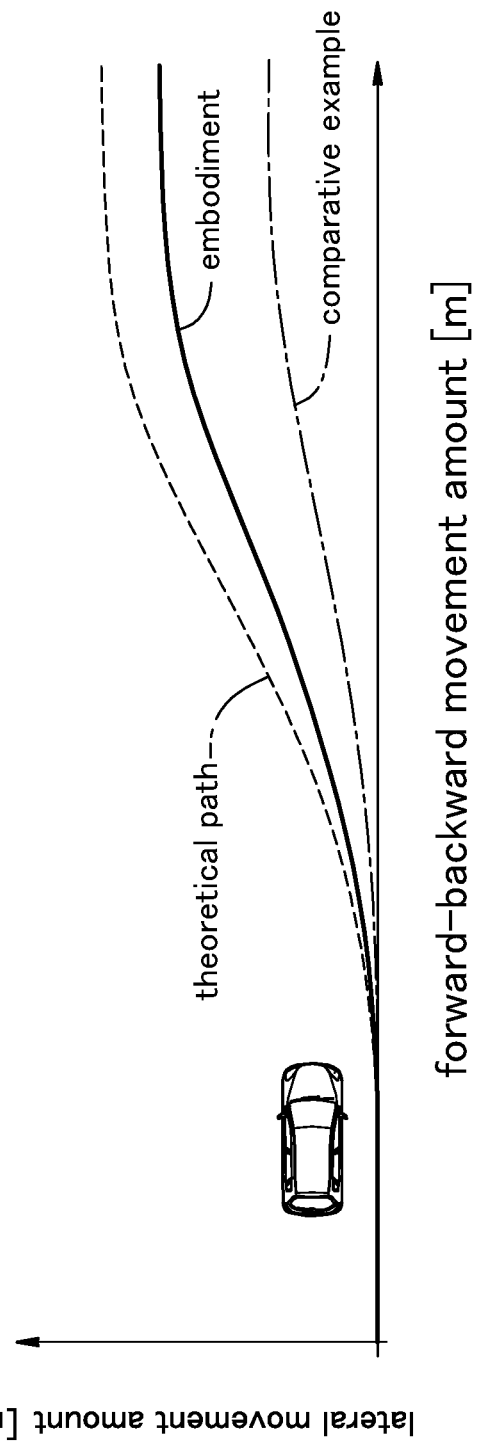

TRAVEL CONTROL SYSTEM AND TRAVEL CONTROL METHOD

TECHNICAL FIELD

The present invention relates to a travel control system and a travel control method.

BACKGROUND ART

When the tire is gripping, a drive shaft torsional vibration is generated and when the tire slips, the tire slip causes the torsion of the drive shaft to be released and the drive shaft torsional vibration disappears. JP2018-155696A discloses a road surface determination device that determines a road surface by observing a vibration mode of selected parts based on the fact that when a drive shaft torsional vibration is generated, a vibration mode in which an engine block forward-backward resonance and a drive shaft torsional resonance are combined appears on an engine block and a sprung mass (vehicle body) and when the drive shaft torsional vibration disappears, a simple vibration of the engine forward-backward resonance appears.

JP2019-31112A discloses a travel control method which detects a rotation fluctuation of a differential device and a rotation fluctuation of a wheel body connected to the drive shaft via the differential device, sets a slip identification quantity based on an amplitude ratio and a phase delay of a rotation fluctuation amplitude of the wheel body relative to a rotation fluctuation amplitude of the differential device, and controls the driving force of a tire such that the slip identification quantity does not exceed a slip identification quantity threshold value which corresponds to an elastic slip limit of the tire for the road surface.

In JP2018-155696A, it is determined that the tire is slipping primarily when the disappearance of the drive shaft torsional vibration is confirmed by vibration measurement using an acceleration sensor. However, when the drive shaft torsional vibration disappears, the tire is already in a slip state (road surface μ max state) and the vehicle behavior has started becoming unstable. Ideal control for stabilizing the vehicle behavior is taking measures to suppress slip immediately before the slip, but in the case where the determination whether the tire is slipping is performed after the drive shaft torsional vibration disappears, such ideal control cannot be realized. JP2018-155696A also proposes a method based on vibration measurement using an acceleration sensor to avoid reduction in the detection accuracy of the wheel speed at low speeds. However, the vibration of the engine block and the sprung mass (vehicle body) is cooperatively generated by many components such as a suspension and a mount and the measurement error thereof tends to be influenced by variation and/or deterioration of the components. Also, since the vibration is also influenced by the mass of the sprung mass (vehicle body), a use case such as the number of occupants and the amount of carried load can be a cause of error.

In JP2019-31112A, owing to the introduction of the slip identification quantity that enables determination of the elastic slip limit, it is possible to predict an adhesion limit (elastic slip limit), below which the tire slip (sliding slip) does not occur, before slip occurs. However, the slip identification quantity is an indicator normalized by the slip speed of the tire, and though the slip speed of the tire corresponding to the adhesion limit can be predicted, the driving force of the tire at that time cannot be predicted directly. In actual control, the driving force of the tire is controlled to indirectly control the slip speed, and therefore, the tire may be in the sliding slip state momentarily. Thus, there is room for improvement in the travel control method of JP2019-31112A. Specifically, if the driving force of the tire corresponding to the adhesion limit can be estimated directly, it is possible to maintain the tire in an elastic slip state.

Also, each of JP2018-155696A and JP2019-31112A uses some vibration or rotation fluctuation, when the vibration is not generated or very small relative to the sensor noise, tire slip cannot be determined.

SUMMARY OF THE INVENTION

In view of the foregoing background, a primary object of the present invention is to provide a vehicle control system and a vehicle control method which can estimate the driving force of the tire corresponding to the adhesion limit with high accuracy regardless of deterioration and/or variation of the components difference of the use case of the vehicle, and maintain the tire in the elastic slip state. Another object of the present invention is to provide a vehicle control system and a vehicle control method which are applicable even when a specific vibration or rotation fluctuation is not generated.

To achieve the above object, one aspect of the present invention provides a travel control system for a vehicle (1) provided with a drive source (5), a wheel (3) having a wheel body (W) connected to the drive source via a power transmission member (6) and a tire (T) mounted on the wheel body, and a braking device (8) for braking the wheel, the system comprising: a first rotation sensor (12C) configured to acquire a rotation speed of the drive source; a second rotation sensor (12A) configured to acquire a rotation speed of the wheel body; a vehicle body speed acquisition unit (12B, 12D) configured to acquire information related to a vehicle body speed; a torque acquisition unit (14C) configured to acquire a torque applied to the wheel body; an estimation unit (14A) configured to estimate a tire torsional stiffness, which is a stiffness of the tire, and a road surface friction coefficient, which is a friction property between the tire and a road surface, based on at least the rotation speed of the drive source, the rotation speed of the wheel body, the vehicle body speed, and the torque applied to the wheel body; and a control unit (14B) configured to control at least one of the drive source and the braking device such that the tire does not exceed an adhesion limit derived from the tire torsional stiffness and the road surface friction coefficient.

According to this aspect, it is possible to maintain the tire in the elastic slip state. Because the tire is maintained in the elastic slip state, the vehicle behavior matches the steering operation and the energy loss can be reduced.

In the above aspect, preferably, the estimation unit estimates an adhesion limit driving force corresponding to the adhesion limit of the tire based on the tire torsional stiffness and the road surface friction coefficient.

According to this aspect, the estimation unit estimates the adhesion limit driving force based on the tire torsional stiffness and the road surface friction coefficient that have been estimated. Therefore, the estimation unit can obtain an accurate adhesion limit driving force.

In the above aspect, preferably, the control unit controls at least one of the drive source and the braking device such that an absolute value of the driving force of the tire does not exceed the adhesion limit driving force.

According to this aspect, due to the control unit controlling at least one of the drive source and the braking device based on the adhesion limit driving force, the tire is maintained in the elastic slip state.

In the above aspect, preferably, the vehicle body speed acquisition unit comprises a non-driving wheel rotation sensor (12B) configured to acquire a rotation speed of a non-driving wheel and an acceleration sensor (12D) configured to acquire a forward-backward acceleration of the vehicle, and the estimation unit estimates the vehicle body speed by using a weighted average of a first speed acquired by the non-driving wheel rotation sensor and a second speed acquired by integrating the forward-backward acceleration acquired by the acceleration sensor, and changes weights of the weighted average to maximize a likelihood of a state quantity (for example, the tire torsional stiffness and the road surface friction coefficient) estimated by the estimation unit.

According to this aspect, even when sliding slip is generated in the non-driving wheel, the vehicle body speed can be accurately estimated.

In the above aspect, preferably, the estimation unit determines whether the road surface is rough, and when it is determined that the road surface is rough, changes the weights to reduce influence of the first speed on the vehicle body speed.

According to this aspect, even when the vehicle is traveling on a rough road, the vehicle body speed can be estimated accurately. When the vehicle is traveling on a rough road, a rotation fluctuation occurs in the non-driving wheel due to irregularities of the road surface and, since the timing at which the irregularities are passed differs between the driving wheel and the non-driving wheel, this rotation fluctuation becomes observation noise in obtaining the vehicle body speed. Therefore, when the vehicle is traveling on a rough road, it is preferred to reduce the influence of the first speed of the non-driving wheel on the vehicle body speed. On the other hand, when it is determined that the vehicle is traveling on a flat road, it is possible to increase the influence of the first speed of the non-driving wheel on the vehicle body speed to thereby improve the responsiveness of the estimated value when the road surface friction coefficient changes suddenly. In this way, by determining whether the road surface is rough and accordingly changing the influence of the first speed of the non-driving wheel on the vehicle body speed, it is possible to achieve both the robustness when traveling on a rough road and the high responsiveness of the estimated value.

In the above aspect, preferably, the estimation unit predicts a wheel load based on a forward-backward acceleration and a lateral acceleration and decides the wheel load to maximize a likelihood of at least one of the wheel load, the tire torsional stiffness, and the road surface friction coefficient.

According to this aspect, it is possible to estimate the wheel load taking into account a change in the sprung mass (vehicle body) attitude such as pitch and roll and a change in the number of occupants and/or the amount of carried load. The estimation unit corrects the change in the sprung mass (vehicle body) attitude, which is a transient change of the wheel load, based on the forward-backward acceleration and the lateral acceleration, and decides the wheel load to maximum the aforementioned likelihood thereby to correct a steady state change of the wheel load due to a change in the number of occupants and/or the amount of carried load. By using the estimated wheel load, it is possible to properly estimate the tire torsional stiffness and the road surface friction coefficient.

In the above aspect, preferably, the estimation unit calculates an adhesion limit slip ratio corresponding to the adhesion limit of the tire for the road surface based on the tire torsional stiffness and the road surface friction coefficient, and the control unit controls at least one of the drive source and the braking device such that an absolute value of a slip ratio of the tire is less than or equal to the adhesion limit slip ratio.

According to this aspect, it is possible to bring the tire back in the elastic slip state based on the slip ratio and the adhesion limit slip ratio. In the sliding slip state, the driving force of the tire decreases as the slip ratio increases. Therefore, in the sliding slip state, even when the driving force of the tire is less than or equal to the adhesion limit driving force, the sliding slip state may be maintained. In such a case, it is possible to bring the tire back in the elastic slip state by limiting the driving force of the tire such that the slip ratio is less than or equal to the adhesion limit slip ratio.

Another aspect of the present invention provides a travel control method of a vehicle (1) provided with a drive source (5), a wheel (3) having a wheel body (W) connected to the drive source via a power transmission member (6) and a tire (T) mounted on the wheel body (W), a braking device (8) for braking the wheel, and a control device (14), the method being executed by the control device and comprising: estimating a tire torsional stiffness, which is a stiffness of the tire, and a road surface friction coefficient, which is a friction property between the tire and a road surface, based on at least a rotation speed of the drive source, a rotation speed of the wheel, and a vehicle body speed; estimating an adhesion limit driving force corresponding to an adhesion limit of the tire based on the tire torsional stiffness and the road surface friction coefficient; and controlling at least one of the drive source and the braking device such that an absolute value of a driving force of the tire is maintained less than or equal to the adhesion limit driving force.

According to this aspect, since the tire torsional stiffness and the road surface friction coefficient estimated and the adhesion limit driving force is estimated based on the tire torsional stiffness and the road surface friction coefficient that have been estimated, it is possible to obtain an accurate adhesion limit driving force. By controlling the drive source and the braking device based on the adhesion limit driving force, the tire is maintained in the elastic slip state. Because the tire is maintained in the elastic slip state, the vehicle behavior matches the steering operation and the energy loss can be reduced.

According to the foregoing configuration, it is possible to provide a vehicle control system and a vehicle control method which can estimate the driving force of the tire corresponding to the adhesion limit and maintain the tire in the elastic slip state.

BRIEF DESCRIPTION OF THE DRAWINGS

FIG. 9 is an explanatory diagram showing a path in the embodiment and in the comparative example together with a theoretical path.

DETAILED DESCRIPTION OF THE INVENTION

Figure 1:
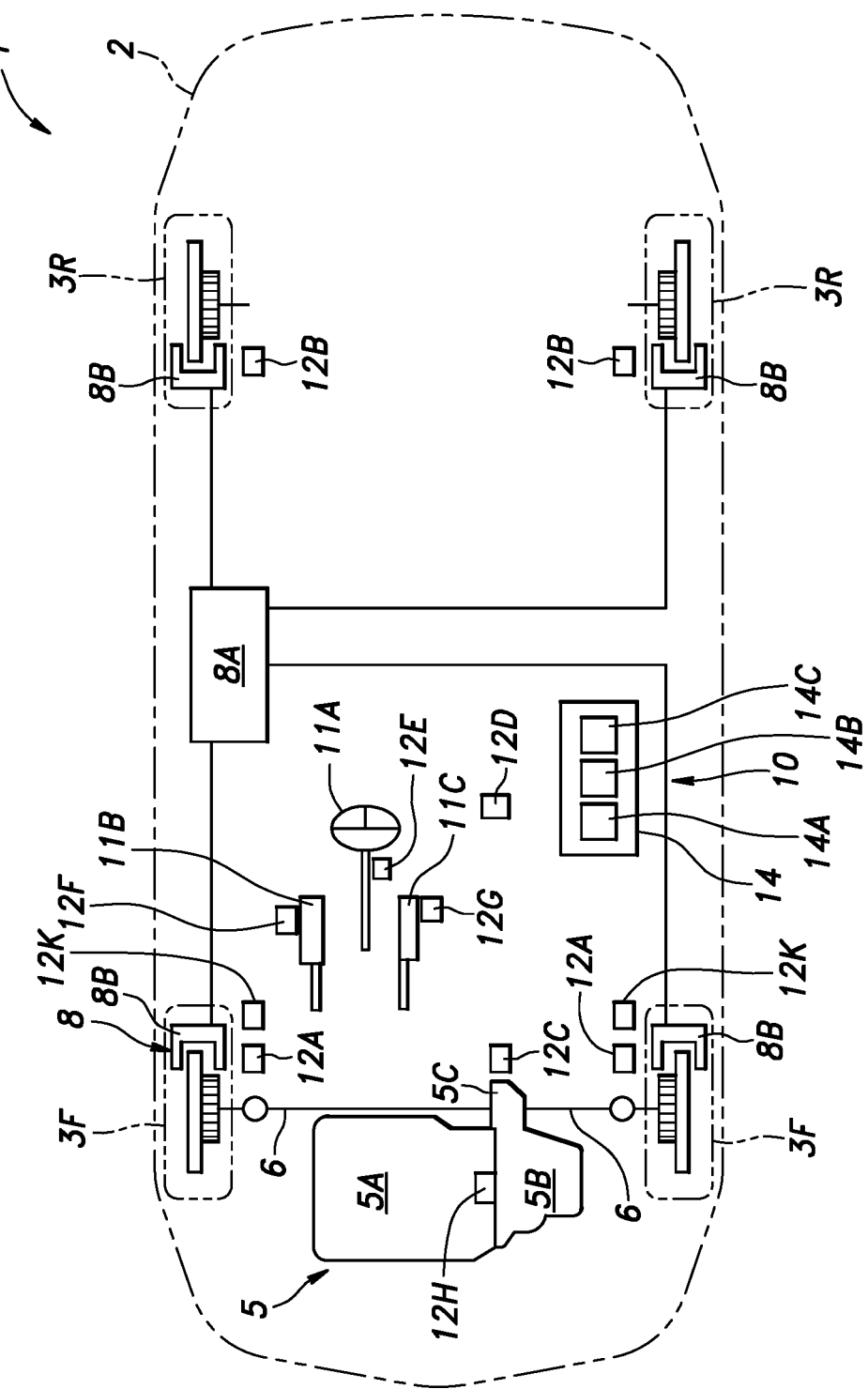
FIG. 1 is a configuration diagram of a vehicle in which a vehicle control system is installed.

In the following, a travel control system and a vehicle control method according to an embodiment of the present invention will be described with reference to the drawings. As shown in FIG. 1, a vehicle 1 is a four-wheeled automobile and has a vehicle body 2 and four wheels 3 provided on the vehicle body 2. The wheels 3 include two front wheels 3F which are driving wheels and two rear wheels 3R which are non-driving wheels. Each wheel 3 has a wheel body W and a tire T mounted on the wheel body W.

The vehicle 1 has a drive source 5 for driving the front wheels 3F. The drive source 5 may be an internal combustion engine or an electric motor. The drive source 5 may include a reducer and a differential device. In the present embodiment, the drive source 5 is configured by an internal combustion engine 5A, a reducer 5B, and a differential device 5C (DN). The differential device 5C of the drive source 5 is connected to each front wheel 3F via a power transmission member 6. The power transmission member 6 may be a drive shaft.

The vehicle 1 has braking devices 8 for braking the respective wheels 3. Each braking device 8 includes a hydraulic pressure supply device 8A and a disc brake 8B provided in the wheel body W of each wheel 3 to be actuated by the hydraulic pressure from the hydraulic pressure supply device 8A.

The vehicle 1 has a travel control system 10 that controls the drive source 5 and the braking device 8. The travel control system 10 includes a control device 14 that controls the drive source 5 and the braking device 8 based on the signals from a driving operation element 11 and a vehicle sensor 12. The driving operation element 11 includes a steering wheel 11A for receiving a steering operation of the driver, an accelerator pedal 11B for receiving an acceleration operation of the driver, and a brake pedal 11C for receiving a deceleration operation of the driver.

The vehicle sensor 12 includes left and right front wheel speed sensors 12A (first rotation sensor) that detect the rotation speeds of the left and right front wheel, respectively, left and right rear wheel speed sensors 12B (non-driving wheel rotation sensor) that detect the rotation speeds of the left and right rear wheel, respectively, a drive source rotation speed sensor 12C (second rotation sensor) that detects the rotation speed of an output end of the drive source 5, and an acceleration sensor 12D that detects the forward-backward acceleration and the lateral acceleration of the vehicle body 2. The front wheel speed sensors 12A and the rear wheel speed sensors 12B each detect the rotation speed of the corresponding wheel body W. The left and right rear wheel speed sensors 12B and the acceleration sensor 12D function as a vehicle body speed acquisition unit that acquires information related to the vehicle body speed.

The drive source rotation speed sensor 12C detects the rotation speed of the final gear of the differential device of the drive source 5. The vehicle sensor 12 further includes a steering angle sensor 12E that detects the steering angle of the steering wheel 11A, an accelerator pedal sensor 12F that detects the operation amount of the accelerator pedal 11B, a brake pedal sensor 12G that detects the operation amount of the brake pedal 11C, and an engine rotation speed sensor 12H that detects the rotation speed of the internal combustion engine 5A. Also, the vehicle sensor 12 includes a vertical acceleration sensor 12K that detects the vertical acceleration of the vehicle body 2. The vertical acceleration sensor 12K is preferably provided for each wheel 3. The vertical acceleration sensor 12K may be provided on a suspension arm (not shown in the drawings) supporting each wheel 3. The acceleration sensor 12D and the vertical acceleration sensor 12K may be configured as a common 3-axis or 6-axis acceleration sensor. The output torque of the internal combustion engine 5A is estimated by the control device 14, as described later.

The control device 14 is an electronic control unit (ECU) constituted of a CPU, a ROM, a RAM, and the like. The control device 14 performs various vehicle controls by executing computational processing according to a program with the CPU. The control device 14 includes an estimation unit 14A, a control unit 14B, and a torque acquisition unit 14C (torque acquisition means). The estimation unit 14A estimates a tire torsional stiffness, which is a torsional stiffness of the tire T, and a road surface friction coefficient, which is a friction property between the tire T and the road surface based on at least the rotation speed of the drive source 5, the rotation speed of the wheel body W, the vehicle body speed, and the torque applied to the wheel body W, and estimates an adhesion limit driving force corresponding to an adhesion limit of the tire based on the tire torsional stiffness and the road surface friction coefficient. The control unit 14B controls at least one of the drive source 5 and the braking device 8 such that the tire does not exceed the adhesion limit derived from the tire torsional stiffness and the road surface friction coefficient. Also, the control unit 14B controls at least one of the drive source 5 and the braking device 8 such that the driving force of the tire is less than or equal to the adhesion limit driving force.

The torque acquisition unit 14C acquires the output torque of the internal combustion engine 5A. The torque acquisition unit 14C preferably estimates the output torque of the internal combustion engine 5A based on an intake air volume and a negative pressure in the intake manifold, for example. Also, when the drive source 5 is an electric motor, the output torque of the electric motor is preferably estimated based on the phase current supplied to the electric motor. Note that in another embodiment, a torque sensor for detecting the output torque may be provided on the internal combustion engine 5A or the electric motor. Also, the torque acquisition unit 14C estimates the braking torque applied to the wheel body W based on the amount of control of the braking device 8 by the control unit 14B.

In the following, an estimation method of the tire torsional stiffness, the road surface friction coefficient, and the adhesion limit driving force by the estimation unit 14A will be described. The estimation unit 14A performs the estimation by executing a program constructed based on the theory shown below.

Since the wheel body W is made of metal such as aluminum or steel and the stiffness thereof is sufficiently high compared to the tire T which is made of rubber. When a driving torque is applied to the wheel body W, elastic deformation occurs in a side wall portion and a tread portion of the tire T. Therefore, it is assumed here that the wheel body W and the tread surface of the tire T are represented by rigid body masses with a spring force acting in a direction to suppress the torsion between them. At the contact part between the tire T and the road surface, the tire T deforms due to the mass of the vehicle 1 so that the tire T makes contact (ground contact surface) with the road surface with a certain constant width (ground contact width). A friction force F acts between the tire and the road surface at the ground contact surface, and this friction force F is expressed by the following formula.

$$F = \mu N \tag{1}$$

Here, $\mu$ is a road surface friction coefficient, which is a friction coefficient between the tire T and the road surface, and N is a wheel load, which is a ground contact load of the tire T. The road surface friction coefficient $\mu$ changes depending on the air pressure and aging of the tire T, the road surface, the weather, the climate, and so on. The magnitude of the friction force F needs to match the magnitude of the driving force, which is a force for making the vehicle 1 travel (acceleration, deceleration, or constant speed travel) against the travel resistance.

At the moment when the driving torque is applied to the wheel body W, torque is not yet transmitted to the tire T and the tire T does not roll yet. At this time, the tire T deforms elastically and a torsion angle is generated between the wheel body W and the tire T. In this state, the tire T is in a stationary torsion state in which the torsion angle is generated in proportion to the driving torque of the wheel body W. Upon generation of the torsion angle, torque is transmitted to the tire T as a reaction force thereof, and the tire T starts rolling. As the tire T rolls, one element of the tire T that was generating the elastic deformation leaves from the ground contact surface and the elastic strain is released. At this time, the reaction force for transmitting the driving torque of the wheel body W becomes insufficient by the magnitude corresponding to the released elastic strain, and thus, the rolling of the tire T is going to stop temporarily. However, in place of the one element of the tire T that has left the ground contact surface, a new element of the tire T comes into contact with the road surface and produces an elastic strain so that the lost reaction force is recovered and the tire T rolls again. A case like this where the boundary condition regarding the individual elements is not unique to each element and moves along the motion of the element is particularly called a moving boundary. When the actual tire T rolls continuously, the above phenomenon occurs in succession, and therefore, the rolling angle of the tire T decreases at a constant rate relative to the rotation angle of the wheel body W. Since the rotation angle of the wheel body W per unit time is proportional to the rotation speed (rotation angular speed), the rolling angle of the tire T per unit time also relatively decreases in proportion to the rotation speed of the wheel body W, and a constant rotation transmission loss occurs. This phenomenon is called elastic slip because an apparent slip is generated between the wheel body W and the road surface due to elastic deformation. Since an amount of elastic slip is created at a constant rate relative to the rotation speed of the wheel body W, a ratio $S_r$ between the rotation speed loss $\Delta\omega$ due to the slip and the rotation speed $\omega_{wheel}$ of the wheel body W is regarded as a slip speed ratio.

$$S_r = \Delta\omega/\omega_{wheel} \tag{2}$$

Figure 2:
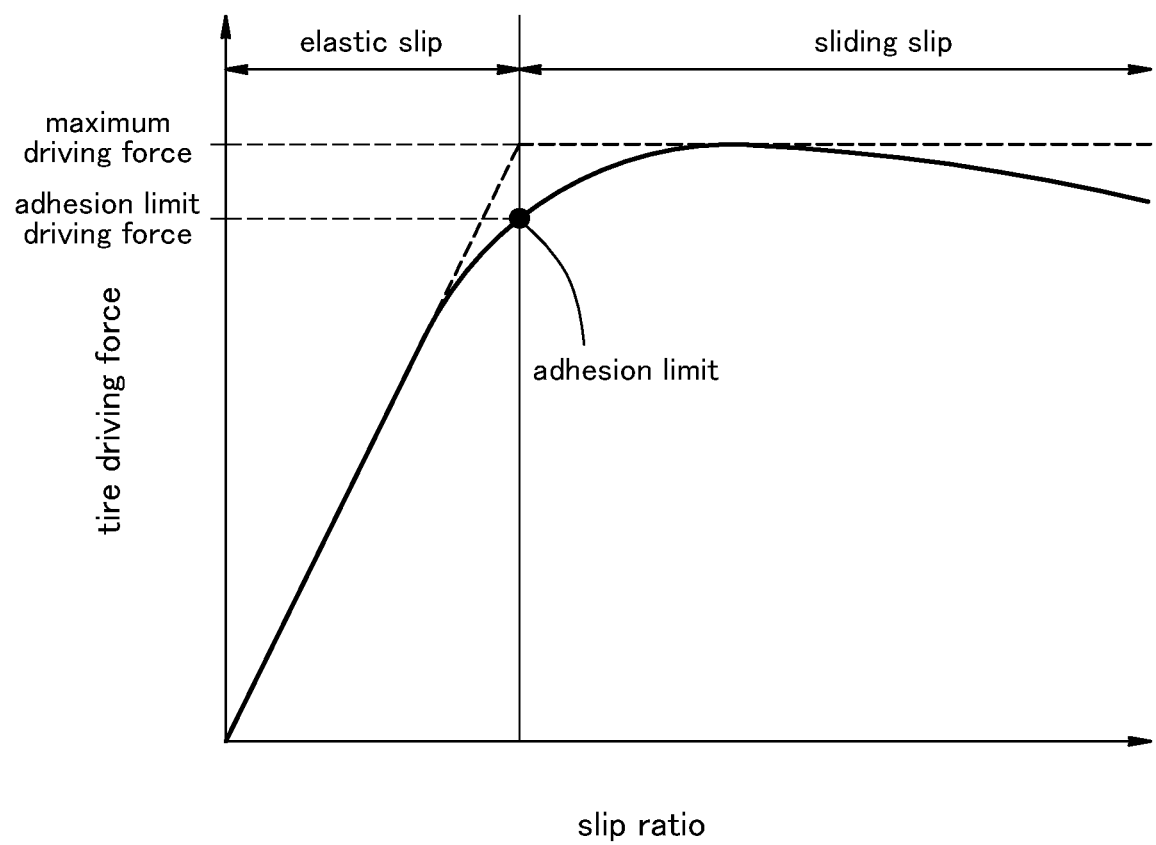
FIG. 2 is a graph showing a relationship between a slip ratio and a tire driving force.

The characteristics of the elastic slip of the tire T are illustrated in FIG. 2. Because there is a limit to the friction force between the tire T and the road surface, as the driving torque of the wheel body W increases, the ground contact surface of the tire T and the road surface start slipping. This is called sliding slip to distinguish from the elastic slip. Thus, as the driving torque of the wheel body W increases, the elastic slip state shifts to the sliding slip state. The boundary between the elastic slip state and the sliding slip state is called an elastic slip limit or an adhesion limit, and the driving force (torque) corresponding to the adhesion limit is called an adhesion limit driving force (torque).

In the elastic slip state, when a torsion angle $\varphi_E$ has occurred between the wheel body W and the tire T due to elastic deformation and the ground contact surface has moved by the ground contact length, a strain energy ($k_T \times \varphi_E^2/2$) due to the elastic deformation is stored in the ground contact surface before rolling, and the strain energy is released by the rolling. This strain energy does no work in relation to the travel of the vehicle 1, and therefore, it can be considered that in this state, the driving energy from the wheel body W is dissipated by the cycle of buildup and release of strain. With the understanding that such energy dissipation occurs due to the apparent slip (elastic slip), the following formula can be obtained using the friction force F acting on the ground contact surface.

$$k_T \varphi_E^2/2 = FR\varphi_E = T_f \varphi_E \tag{3}$$

Namely, the energy dissipation can be substituted by the virtual work calculated from the friction force and the apparent slip as shown in the formula 3, where $k_T$ is a torsional stiffness [Nm/rad] of the tire T, R is a dynamic radius [m] of the tire T, and $T_f$ is a friction torque [Nm] produced at the ground contact surface. Provided that when the tire T rolls in accordance with the torsion angle $\varphi_E$, the rotation angle of the wheel body W including the torsion angle $\varphi_E$ is $\varphi_{wheel}$, the slip speed ratio $S_r$ is represented by the following formula 4 based on the geometric relationship.

$$S_r = \varphi_E/\varphi_{wheel} \tag{4}$$

From the formula 2 and the formula 4, $\varphi_E$ is represented by the following formula 5.

$$\varphi_E = (\varphi_{wheel}/\omega_{wheel})\Delta\omega \tag{5}$$

By putting this into the formula 3, the following formula 6 is derived.

$$T_f = (k_T \varphi_{wheel}/2\omega_{wheel})\Delta\omega = c_T \Delta\omega \tag{6}$$

As expressed in the formula 6, the friction torque $T_f$ is represented by a viscous resistance force that is proportional to the slip (rotation speed loss) $\Delta\omega$ occurring between the wheel body W and the road surface. Here, $c_T$ is a friction damping coefficient [Nm/(rad/s)] between the tire and the road surface, corresponds to a viscosity coefficient, and is proportional to the tire torsional stiffness $k_T$.

Figure 3:
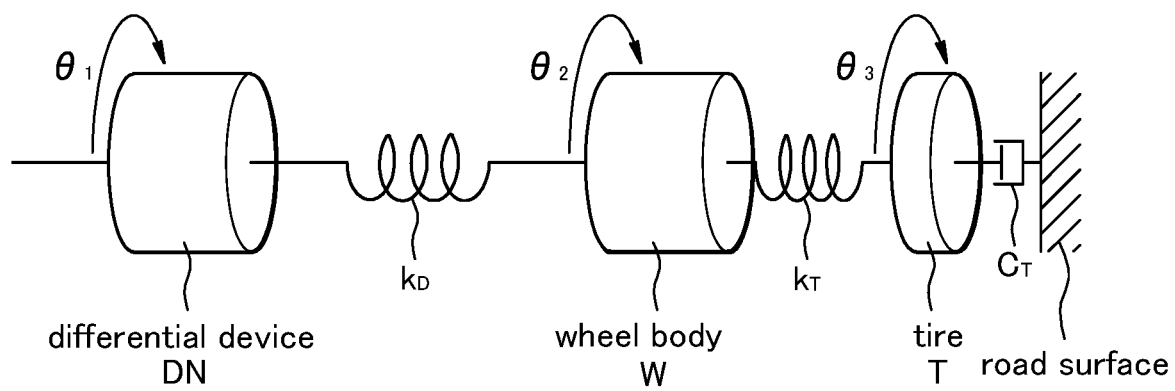
FIG. 3 is an explanatory diagram showing a dynamic model of a driving wheel.

A dynamic model from the drive source 5 to the contact surface can be represented as illustrated in FIG. 3. Based on this model, the state equation is represented by the formula 7 below. The formula 7 is derived for one of the left and right front wheels of the vehicle 1 constituted as an FF vehicle which has the internal combustion engine installed in the front portion thereof to drive the front wheels via the transmission.

$$\left. \begin{array}{l} I_W \ddot{\theta}_W = k_D(\theta_{DN} - \theta_W) - k_T(\theta_W - \theta_T) \\ I_T \ddot{\theta}_T = k_T(\theta_W - \theta_T) - c_T \dot{\theta}_T \end{array} \right\} \tag{7}$$

Here, $\theta_{DN}$ is a rotation angle perturbation [rad] of the final gear of the differential device DN (the output shaft of the drive source 5), $\theta_W$ is a rotation angle perturbation [rad] of the wheel body, OT is a rotation angle perturbation [rad] of the tire, $I_w$ is a moment of inertia [kgm²] of the wheel body, $I_T$ is a moment of inertia [kgm²] of the tire, and $k_D$ is a torsional stiffness [Nm/rad] of the power transmission member 6 (drive shaft).

By making the formula 7 dimensionless using the following formula 8, the state variable (vector quantity) represented by the formula 9 can be represented by the formula 10.

$$x_1 = \theta_{DN}, x_2 = \theta_W, x_3 = \theta_T \quad (8)$$

$$\omega_1 = \sqrt{\frac{k_D}{I_W}}, \omega_2 = \sqrt{\frac{k_T}{I_W}}$$

$$\rho = \sqrt{\frac{I_W}{I_T}}, \zeta_2 = \frac{c_T}{\sqrt{I_W k_T}}$$

$$x = {}^t(x_2 \dot{x}_2 x_3 \dot{x}_3) \quad (9)$$

$$\dot{x} = Ax \quad (10)$$
$$A = \begin{pmatrix} 0 & 1 & 0 & 0 \\ -\omega_1^2-\omega_2^2 & 0 & \omega_2^2 & 0 \\ 0 & 0 & 0 & 1 \\ \rho^2\omega_2^2 & 0 & -\rho^2\omega_2^2 & -\rho^2\omega_2\zeta_2 \end{pmatrix}$$

Figure 4A:
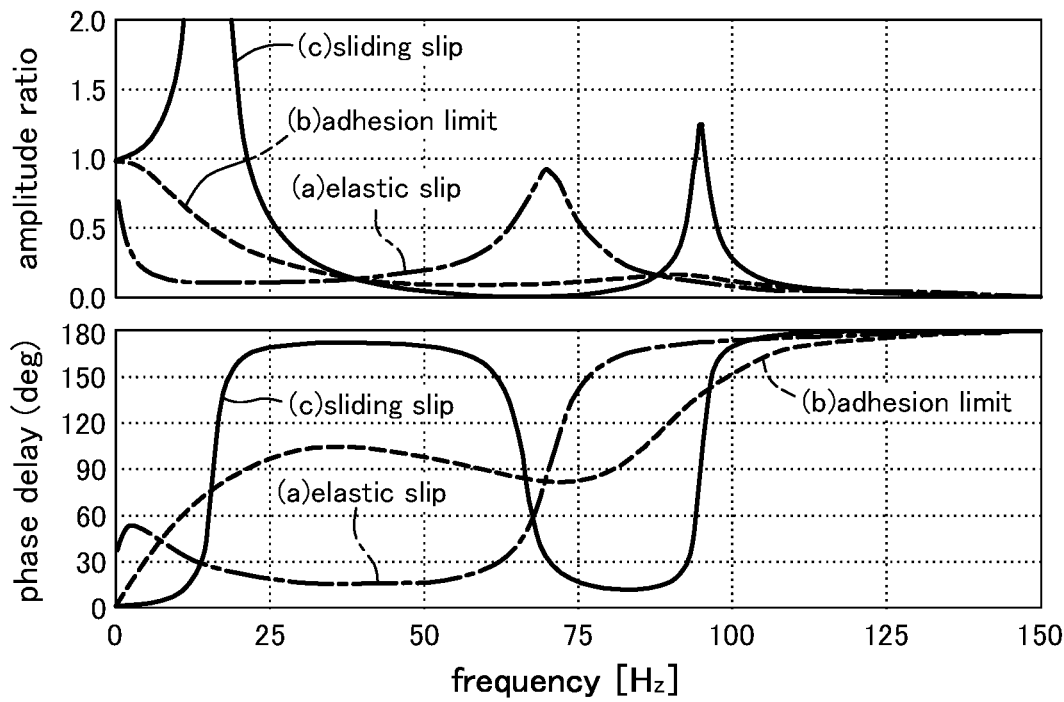
FIG. 4A is a graph showing the characteristics of the rotation fluctuation transmission between a differential device and the driving wheel.

The frequency response of the rotation fluctuation of the wheel body W to the rotation fluctuation of the differential device DN obtained from the formula 10 can be illustrated as in FIG. 4A. FIG. 4A shows, with respect to the frequency, an amplification ratio (amplitude ratio m) of the rotation fluctuation amplitude of the wheel body W to the rotation fluctuation amplitude of the differential device DN and a phase delay (phase delay Ψ1) of the rotation fluctuation of the wheel body W relative to the rotation fluctuation of the differential device DN.

From the formula 6, the slip state approaches the sliding slip state as the value of the friction damping coefficient $c_T$ decreases. In FIG. 4A, (a) represents the response in the elastic slip state, and (c) represents the response in the sliding slip state. Also, (b) indicates the boundary (adhesion limit) between the two slip states. When the graphs (a) and (c) indicating the amplitude ratios in FIG. 4A are compared with each other, it can be seen that when the sliding slip state is entered, a new peak appears on the low frequency side and the peak on the high frequency side moves toward a higher frequency side. The vibration mode corresponding to the peak on the high frequency side will be referred to as an elastic slip mode, and the vibration mode corresponding to the peak on the low frequency side will be referred to as a sliding slip mode.

Figure 4B:
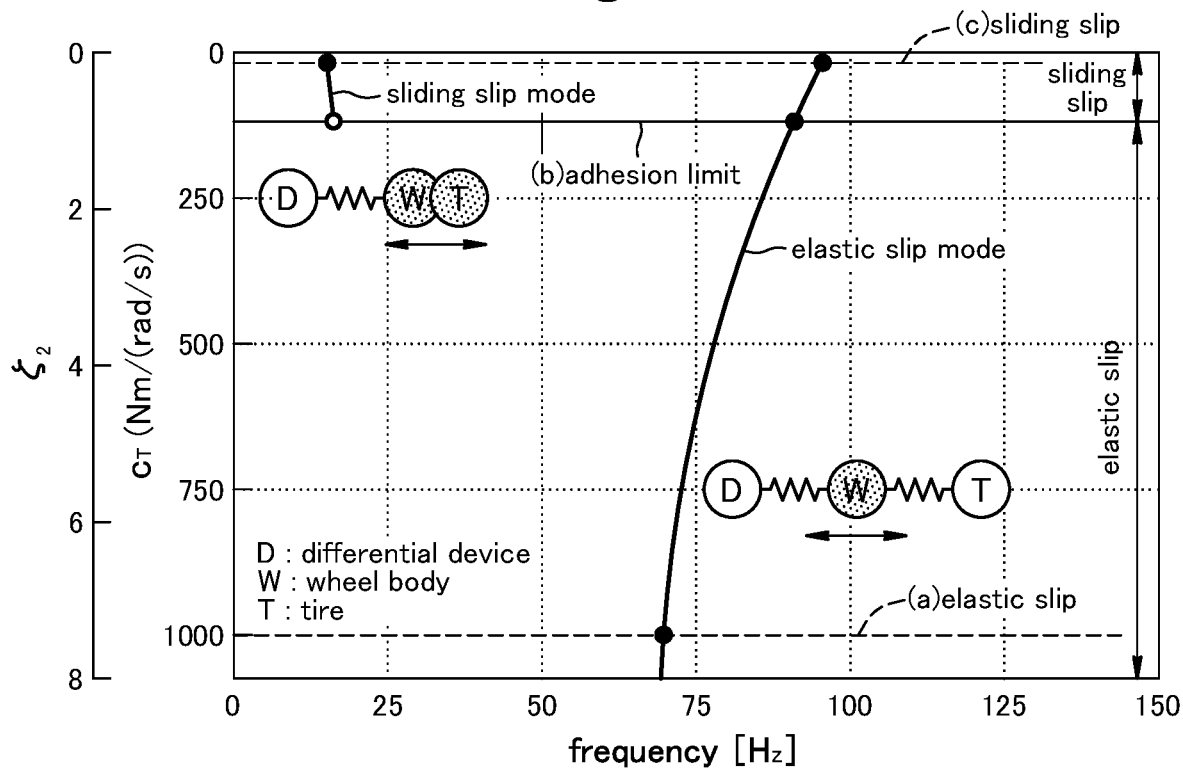
FIG. 4B is an explanatory diagram showing a relationship between the frequency and vibration modes.

Existence ranges of the elastic slip mode and the sliding slip mode with respect to the frequency and the friction damping coefficient $c_T$ are illustrated in FIG. 4B. In FIG. 4B, the existence ranges of the elastic slip mode and the sliding slip mode are shown by solid lines.

In the elastic slip mode, since the driving force is transmitted to the road surface due to the elastic deformation of the tire T, the elastic force produced by the tire torsional stiffness $k_T$ acts on the wheel body W as a reaction force. Therefore, the wheel body W receives a combination of the elastic forces produced by the drive shaft stiffness $k_D$ and the tire torsional stiffness $k_T$ so that the wheel body W vibrates. The elastic slip mode is seen on the high frequency side in FIGS. 4A and 4B. As shown in FIG. 4B, the elastic slip mode shifts toward a higher frequency side as the friction damping coefficient $c_T$ decreases, namely, as the slip state approaches the sliding slip state from the elastic slip state. This corresponds to the phenomenon that in the graph showing the amplitude ratios in FIG. 4A, the peak on the high frequency side is moved toward a higher frequency side when the state has transitioned to the sliding slip state.

In the sliding slip mode, since the tire T and the road surface dynamically slip, the elastic force produced due to the tire torsional stiffness $k_T$ is released by the slip and the reaction force acting on the wheel body W also disappears. Therefore, the wheel body W and the tire T become unitary and receive only the elastic force produced due to the drive shaft stiffness $k_D$ so that they vibrate in the same phase. The sliding slip mode is seen on the low frequency side in FIGS. 4A and 4B. As shown in FIG. 4B, the sliding slip mode appears when the friction damping coefficient $c_T$ becomes less than the constant value, namely, namely when the slip state becomes the sliding slip state, and does not appear in the elastic slip state. This corresponds to the phenomenon that in the graph showing the amplitude ratio in FIG. 4A, a new peak appears on the low frequency side when the slip state becomes the sliding slip state.

As described above, as the slip state transitions from the elastic slip state to the sliding slip state, the sliding slip mode emerges. Therefore, it appears to be possible to determination the adhesion limit by monitoring the emergence of the sliding slip mode. However, as seen by the amplitude ratio in FIG. 4A, a peak on the low frequency side cannot be confirmed yet at the adhesion limit. When a peak on the low frequency side is clearly confirmed as in the road surface determination device described in JP2018-155696A, only a state in which the sliding slip has already progressed can be determined (in JP2018-155696A, since the vibration observation position is different, it appears that the mode disappears along with the sliding slip, but they are the same as phenomena). Namely, only by simply observing the vibration waveform, it is not possible to strictly determine the emergence of the sliding slip mode. In the first place, it is not possible to predict the adhesion limit from the elastic slip state. Therefore, an attention is focused on a dimensionless quantity $\zeta_2$ representing the damping state of the system. As shown in the formula 8, the dimensionless quantity $\zeta_2$ is a quantity made dimensionless by the friction damping coefficient $c_T$ and the tire torsional stiffness $k_T$ and uniquely representing the damping state of the system regardless of changes of various factors. If the current dimensionless quantity $\zeta_2$ can be estimated, by comparing it with a threshold value corresponding to the adhesion limit, occurrence of the sliding slip can be strictly determined. Also, since the deviation between the dimensionless quantity $\zeta_2$ and the aforementioned threshold value can be used as a basis for determining the margin till the sliding slip occurs, it is useful to know the dimensionless quantity $\zeta_2$. In the following, first, an acquisition method of the dimensionless quantity $\zeta_2$ will be described.

A torque fluctuation generally occurs in the internal combustion engine serving as the drive source 5 of the vehicle 1, and this torque fluctuation is also transmitted to the tire from the differential device DN. As a cause of the torque fluctuation, there is a fluctuation of the cylinder internal pressure in the case of the internal combustion engine, and a cogging torque attributed to the number of poles in the case of the electric motor. In the differential device DN, a rotation fluctuation attributed to the input torque fluctuation occurs simultaneously. Here, the rotation fluctuation of the differential device DN is expressed by the following formula 11.

$$\dot{x}_1 = A_1 \sin \Omega t \quad (11)$$

The formula 11 can be considered a forced excitation under the boundary condition. $A_1$ is a rotation fluctuation amplitude [m] of the differential device DN, $\Omega$ is an angular frequency [rad/s] of the excitation force (torque fluctuation of the internal combustion engine E), and t is time [s]. In such a forced excitation state, the state equation indicated by the formula 10 becomes as follows.

$$\dot{x} = Ax + B \quad (12)$$
$$A = \begin{pmatrix} 0 & 1 & 0 & 0 \\ -\omega_1^2 - \omega_2^2 & 0 & \omega_2^2 & 0 \\ 0 & 0 & 0 & 1 \\ \rho^2\omega_2^2 & 0 & -\rho^2\omega_2^2 & -\rho^2\omega_2\zeta_2 \end{pmatrix} \cdot B = \begin{pmatrix} 0 \\ -\frac{\omega_1^2}{\Omega} A_1 \cos\Omega t \\ 0 \\ 0 \end{pmatrix}$$

In the formula 12, B represents an external force (excitation input), and the natural vibration mode (hereinafter referred to as a natural mode) that the original system has is determined by a Jacobian matrix A. The parameters deciding the Jacobian matrix A are $\rho$, $\omega_1$, $\omega_2$, and $\zeta_2$ of which $\rho$ and $\omega_1$ are design specifications (known values). Therefore, once the dimensionless quantity $\omega_2$ and the dimensionless quantity corresponding to the slip identification quantity are known, the natural mode can be known. In the formula 7, there are two dominant equations while there are two dimensionless quantities that are unknown (namely, $\omega_2$ and $\zeta_2$), and therefore, $\omega_2$, $\zeta_2$ should be able to be decided uniquely. Note that because the dimensionless quantity $\omega_2$ is obtained from the tire torsional stiffness $k_T$ and the dimensionless quantity $\zeta_2$ is obtained from the friction damping coefficient $c_T$ and the tire torsional stiffness $k_T$, that the dimensionless quantities $\omega_2$, $\zeta_2$ can be decided is equivalent to that the friction damping coefficient $c_T$ and the tire torsional stiffness $k_T$ can be decided.

Assume that the periodic solutions of the formula 12 are represented as follows.

$$\dot{x}_1 = A_1 \sin(\tau + \Psi_1)$$
$$\dot{x}_2 = A_2 \sin \tau$$
$$\dot{x}_3 = A_3 \sin(\tau - \Psi_3)$$
$$\tau = \Omega t \quad (13)$$

By putting the periodic solutions of the formula 13 into the formula 12 and performing coefficient decision based on the Galerkin method, the following relational expression is obtained.

$$\left. \begin{array}{l} \dfrac{\rho^4 \zeta_2 \left(\dfrac{\omega_2}{\omega_1}\right)^2 \left(\dfrac{\Omega}{\omega_2}\right)}{\left(\dfrac{\Omega}{\omega_2}\right)^4 + \rho^2(\rho^2\zeta_2^2 - 2)\left(\dfrac{\Omega}{\omega_2}\right)^2 + \rho^4} = \dfrac{\sin\Psi_1}{m} \\[2ex] 1 + \left(\dfrac{\omega_2}{\omega_1}\right)^2 \left\{1 - \left(\dfrac{\Omega}{\omega_2}\right)^2\right\} + \dfrac{\rho^2\left(\dfrac{\omega_2}{\omega_1}\right)^2 \left\{\left(\dfrac{\Omega}{\omega_2}\right)^2 - \rho^2\right\}}{\left(\dfrac{\Omega}{\omega_2}\right)^4 + \rho^2(\rho^2\zeta_2^2 - 2)\left(\dfrac{\Omega}{\omega_2}\right)^2 + \rho^4} = \dfrac{\cos\Psi_1}{m} \\[2ex] m = \dfrac{A_2}{A_1} \end{array} \right\} \quad (14)$$

Here, m is an amplification ratio (amplitude ratio) of the rotation fluctuation amplitude of the wheel body to the rotation fluctuation amplitude of the differential device DN, and $\Psi_1$ is a phase delay of the rotation fluctuation of the wheel body relative to the rotation fluctuation of the differential device DN. Thus, by measuring the rotation fluctuation of the differential device DN and the rotation fluctuation of the wheel body, it is possible to obtain the dimensionless quantities $\omega_2$, $\zeta_2$ from the formula 14.

Figure 5:
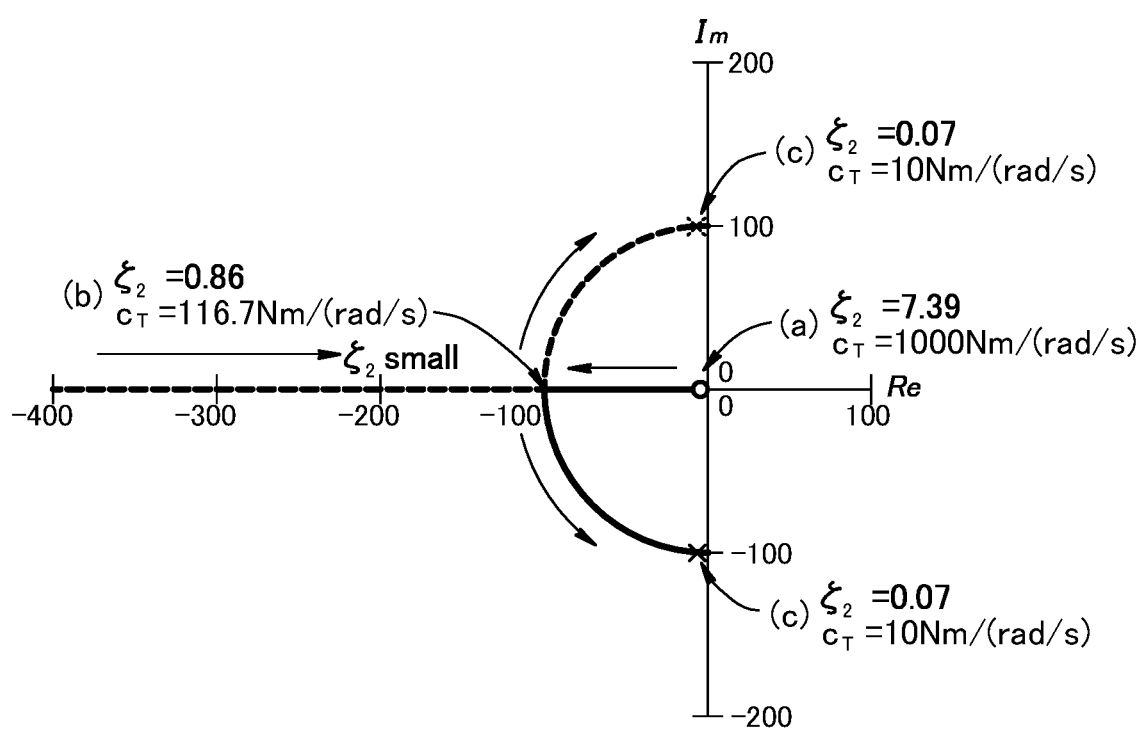
FIG. 5 is a diagram showing a root locus in an elastic slip mode and a sliding slip mode.

Next, provided that the current dimensionless quantities $\omega_2$, $\zeta_2$ have been obtained from the formula 14, a method of acquiring the relationship between the dimensionless quantity $\zeta_2$ and the natural mode will be described. The dimensionless quantity $\omega_2$ reflects the change of the tire torsional stiffness $k_T$ but since there is not a significant change under the same condition, description will be made of the relationship between the dimensionless quantity $\zeta_2$ and the natural mode with an assumption that the tire torsional stiffness $k_T$ is constant. Accordingly, the dimensionless quantity $\zeta_2$ uniquely corresponds to the friction damping coefficient $c_T$. The behavior of the natural mode can be described by obtaining the eigenvalue $\lambda$ of the Jacobian matrix A. FIG. 5 shows the behavior of the eigenvalue $\lambda$ (root locus) corresponding to the above-described sliding slip mode. (a) to (b) of FIG. 5 correspond to (a) to (c) of FIG. 4A. Note that if the tire torsional stiffness $k_T$ changes, the frequency of the vibration mode changes, and accordingly, the scale of the root locus of FIG. 5 changes but there is no change in the main properties described below. Also, in such a case, the dimensionless quantity $\omega_2$ in the current situation, and hence the tire torsional stiffness $k_T$ has been known, there is no control problem.

In FIG. 5, the horizontal axis represents a real axis, the vertical axis represents an imaginary axis, and an imaginal part represents a vibration solution. In the elastic slip state (see (a) of FIG. 5), a pair of roots are on the real axis, indicating that there is no vibration solution. Namely, no vibration corresponding to the sliding slip mode is generated. On the other hand, when the slip state becomes the sliding slip state (see (c) of FIG. 5), the root has an imaginary part, indicating that a vibration is produced. Namely, it can be appreciated that when the dimensionless quantity $\zeta_2$ becomes less than $\zeta_C$ (see (c) of FIG. 5), the sliding slip mode emerges. Thus, based on the value of the dimensionless quantity $\zeta_C$, the slip state can be determined as follows:

when the dimensionless quantity $\zeta_2 > \zeta_C$, the slip state is the elastic slip state;

when the dimensionless quantity $\zeta_2 = \zeta_C$, the slip state is the adhesion limit; and when the dimensionless quantity $\zeta_2 < \zeta_C$, the slip state is the sliding slip state, where $\zeta_C$ is a value that varies depending on the design specifications. In FIG. 5, numerical values of $\zeta_2$ and the friction damping coefficient $c_T$ are exemplarily shown in the case where $\zeta_C$ is 0.86. Once the dimensionless quantity $\zeta_C$ is known, the friction damping coefficient $c_{Tc}$ when the slip state becomes the elastic slip limit can be acquired from the formula 8.

However, to estimate the dimensionless quantities $\omega_2$, $\zeta_2$ based on the foregoing theory, a specific vibration is necessary (for example, the torque fluctuation of the internal combustion engine serving as the drive source 5). Namely, there is a problem that when the vibration is not generated or is very small compared to the sensor noise, the tire slip cannot be determined. Therefore, an attention is focused on that the natural mode that the original system has is determined by the Jacobian matrix A as described above. Namely, by identifying the dynamic model from the drive source 5 to the contact surface between the tire T and the road surface shown in FIG. 3 and evaluating the Jacobian matrix A for the identified model, it is possible to estimate the dimensionless quantities $\omega_2$, $\zeta_2$ (the friction damping coefficient $c_T$ and the tire torsional stiffness $k_T$) even when the vibration is not generated.

In the following, a method by which the estimation unit 14A identifies the dynamic model and the tire model shown in FIG. 3 will be described. In this model identification, mainly the tire torsional stiffness $k_T$ and the road surface friction coefficient $\lambda_{\mu x}$ are estimated as model parameters. The estimation unit 14A preferably estimates the tire torsional stiffness $k_T$ and the road surface friction coefficient $\lambda_{\mu x}$ by using a known Kalman filter or observer, for example. In the present embodiment, an example of the estimation method using a Kalman filter will be described. The state equation based on the dynamic model from the drive source 5 to the contact surface shown in FIG. 3 can be expressed by the below formula 15. In the following, description will be exemplarily made of the left front wheel of the vehicle 1 constituted as an FF vehicle in which the internal combustion engine is installed in the front portion of the vehicle 1 to drive the front wheels via the transmission. Estimation can be similarly performed with regard to the other wheels by properly changing or adjusting the torsional stiffness $k_D$ of the power transmission member 6 (drive shaft), the load movement formula, etc.

the front wheel, $\gamma_{fl}$ is a camber angle [deg] of the wheel (the left front wheel), $k_f$ is a front roll stiffness [Nm/rad], $k_r$ is a rear roll stiffness [Nm/rad], h is a height of the center of gravity [m], $d_f$ is a front tread width [m], m is a vehicle weight [kg], $a_y$ is a lateral acceleration [m/s$^2$], $a_x$ is a forward-backward acceleration [m/s$^2$], $T_{DNo}$ is an average torque [Nm] of the final gear of the differential device DN (the output shaft of the drive source 5), $T_{brk}$ is a braking torque [Nm] applied on the wheel body by the braking device 8, $N_e$ is an engine rotation speed [rpm], and v is a coefficient corresponding to the type of the internal combustion engine and is 2 in the case of an inline 4-cylinder 4-stroke engine. The average torque $T_{DNo}$ of the differential device DN is obtained from the estimated output torque of the drive source 5 and the reduction ratio of the transmission. The estimated output torque of the drive source 5 can be generally estimated from the inflow air volume to or the negative pressure in the intake manifold when the drive source 5 is an internal combustion engine, and from the phase current when the drive source 5 is an electric motor. The braking torque $T_{brk}$ can be generally estimated based on the hydraulic pressure from the hydraulic pressure supply device 8A. Also, the Superscript "^ (hat)" indicates that the value is an estimate. The tire side slip angle $\hat{\alpha}_f$ of the front wheel and the camber angle $\hat{\gamma}_{fl}$ of the left front wheel can be estimated by a general method based on the signal of the inertial sensor, the suspension geometry, etc.

$$\frac{d}{dt}\begin{bmatrix} \theta_{DN} \\ \dot{\theta}_{DN} \\ \theta_W \\ \dot{\theta}_W \\ \theta_T \\ \dot{\theta}_T \\ k_T \\ \lambda_{\mu x} \\ F_{zfl} \\ \alpha_{DN} \\ \varphi \\ V_x \end{bmatrix} = \begin{bmatrix} \dot{\theta}_{DN} \\ \frac{1}{I_{DN}}[\alpha_{DN}\sin\varphi - k_D(\theta_{DN} - \theta_W)] \\ \dot{\theta}_W \\ \frac{1}{I_W}[k_\theta(\theta_{DN} - \theta_W) - k_T(\theta_W - \theta_T)] \\ \dot{\theta}_T \\ \frac{1}{I_T}\left[k_T(\theta_W - \theta_T) - R_e(F_{zfl})\cdot F_x(k_T, \lambda_{\mu x}, F_{zfl}, \dot{\theta}_W, V_{cxfl}, \hat{\alpha}_f, \hat{\gamma}_{fl})\right] \\ 0 \\ 0 \\ -\frac{k_f}{(k_f + k_r)d_t}m\dot{a}_y - \frac{h}{2l}m\dot{a}_x \\ 0 \\ 0 \\ \hat{a}_x \end{bmatrix} + \begin{bmatrix} 0 \\ \frac{T_{DN_0}}{I_{DN}} \\ 0 \\ -\frac{T_{brk}}{I_W} \\ 0 \\ 0 \\ 0 \\ 0 \\ 0 \\ 0 \\ \frac{\pi N_e}{30}\cdot v \\ 0 \end{bmatrix} \quad (15)$$

Here, $\theta_{DN}$ is a rotation angle perturbation [rad] of the final gear of the differential device DN (the output shaft of the drive source 5), $\theta_W$ is a rotation angle perturbation [rad] of the wheel body, $\theta_T$ is a rotation angle perturbation [rad] of the tire, $k_T$ is a torsional stiffness [Nm/rad] of the tire, $\lambda_{\mu x}$ is a road surface friction coefficient [-] in the fore and aft direction (friction coefficient between the tire and the road surface), Fz is a wheel load [N], $a_{DN}$ is a torque fluctuation amplitude [Nm], $\varphi$ is a phase [rad] of the torque fluctuation, $V_x$ is a fore-and-aft ground speed [m/s] of the center of gravity of the vehicle, $I_{DN}$ is a moment of inertia [kgm$^2$] of the final gear of the differential device DN (the output shaft of the drive source 5), $k_D$ is a torsional stiffness [Nm/rad] of the power transmission member 6 (drive shaft), $I_w$ is a moment of inertia [kgm$^2$] of the wheel body, $I_T$ is a moment of inertia [kgm$^2$] of the tire, $R_e$ is a tire dynamic radius [m], $F_x$ is a driving force [N], $V_{cxfl}$ is a ground speed [m/s] in the longitudinal direction of the wheel (the left front wheel), $\hat{\alpha}_f$ (^ represents a hat operator) is a tire side slip angle [deg] of In general, when the drive source 5 is an internal combustion engine, a torque fluctuation occurs based on the ignition cycle thereof, and therefore, it is necessary to take into account a periodic torque fluctuation as the output torque of the transmission. Thus, a situation in which the torque fluctuation $T_{DN}$ ($=a_{DN}\cdot\sin \varphi + T_{DNo}$) is transmitted to the wheel via the drive shaft is assumed. Since a torque fluctuation for every ignition cycle occurs in the internal combustion engine, the frequency of the torque fluctuation is proportional to the rotation speed of the internal combustion engine. Namely, the angular frequency $\dot{\varphi}$ ("·" represents a dot) of the torque fluctuation is expressed by the following formula 16. The superscript dot ("·") is a derivative operator, and $\dot{\varphi}$ represents a derivative of the phase angle (namely, an angular frequency). Note that when the drive source 5 is an internal combustion engine, a periodic torque fluctuation is taken into consideration in the model to further improve the estimation accuracy, but even when such a torque fluctuation or specific vibration is not generated, the following Kalman filter functions.

$$\dot{\varphi} = \frac{\pi N_e}{30} \cdot v \qquad (16)$$

The wheel load $F_z$ in the formula 15 is a vertical load acting on each of the front left and right wheels and the rear left and right wheels, and can be expressed by the following formula by taking into account the load movement due to the acceleration and deceleration as well as turning of the vehicle 1. The formula 15 describes the left front wheel load $F_{zfl}$ in the formula 17.

$$F_{zfl} = \frac{m_f}{2}g - \frac{k_f}{(k_f + k_r)}\frac{h}{d_f}ma_y - \frac{h}{2l}ma_x \qquad (17)$$

$$F_{zfr} = \frac{m_f}{2}g + \frac{k_f}{(k_f + k_r)}\frac{h}{d_f}ma_y - \frac{h}{2l}ma_x$$

$$F_{zrl} = \frac{m_r}{2}g - \frac{k_r}{(k_f + k_r)}\frac{h}{d_r}ma_y + \frac{h}{2l}ma_x$$

$$F_{zrr} = \frac{m_r}{2}g + \frac{k_r}{(k_f + k_r)}\frac{h}{d_r}ma_y + \frac{h}{2l}ma_x$$

$R_e(F_z)$ is a tire dynamic radius and depends on the wheel load $F_z$. $F_x$ is a friction force (driving force) in the longitudinal direction of the tire that occurs between the tire and the road surface. $F_x$ is represented by a function having $k_T$, $\lambda_{\mu x}$, $F_z$, $\theta_W$, $V_{cxfl}$, $\alpha\hat{}$, $\gamma\hat{}$ as its arguments by using a tire model based on the Magic formula (Pacejka) and will be explained in detail below.

If, of the use conditions of the tire, the wheel load and/or the slip between the tire and the road surface change, they will influence the driving force generated in the tire. Based on the following formulas 18 to 21, these influences are implemented in the tire model as correction coefficients.

$$df_z = \frac{F_z - F_{zo}}{F_{zo}} \qquad (18)$$

Here, $F_{zo}$ is a standard value [N] of the wheel load assumed for the tire that is used. In this example, the left front wheel load $F_{zfl}$ corresponds to $F_z$.

$$\alpha^* = \tan\alpha \cdot \text{sgn}V_{cx} = -\frac{V_{cy}}{|V_{cx}|} \qquad (19)$$

Here, $\alpha$ is a tire side slip angle [deg], $V_{cx}$ is a ground speed in the longitudinal direction of the wheel [m/s], and $V_{cy}$ is a lateral speed [m/s]. In this example, the tire side slip angle (estimated value) $\alpha\hat{}_f$ of the front wheel is put into $\alpha$. Also, the ground speed $V_{cxfl}$ in the longitudinal direction of the left front wheel which will be described later (formula 38) is put into $V_{cx}$.

$$\gamma^* = \sin\gamma \qquad (20)$$

Here, $\gamma$ is a camber angle [deg] of the wheel, and the camber angle (estimated value) $\gamma\hat{}_{fl}$ of the left front wheel is put into it.

$$\kappa = -\frac{V_{sx}}{|V_{cx}|} = -\frac{V_{cx} - R_e\dot{\theta}_w}{|V_{cx}|} \qquad (21)$$

Here, $\kappa$ is a slip ratio which is an indicator representing the slip in the driving force direction.

When the vehicle 1 is in a straight travelling state, namely, when the side slip angle is 0 (pure slip), the tire torsional stiffness $k_T$, the road surface friction coefficient $\lambda_{\mu x}$, and the wheel load $F_z$ determine main friction characteristics, and the driving force $F_{xo}$ is expressed by the following formulas.

$$F_{xo} = D_x \sin\left[C_x \tan^{-1}\left[B_x\kappa_x - E_x(B_x\kappa_x - \tan^{-1}B_x\kappa_x)\right]\right] \qquad (22)$$

$$K_x = K \qquad (23)$$

$$C_x = p_{Cx1}(>0) \qquad (24)$$

$$D_x = \mu_x F_z (>0) \qquad (25)$$

$$\mu_x = (p_{Dx1} + p_{Dx2}df_z)(1 - p_{Dx3}\gamma^{*2})\lambda_{\mu x} \qquad (26)$$

$$E_x = (p_{Ex1} + p_{Ex2}df_z + p_{Ex3}df_z^2)[1 - p_{Ex4}\text{sgn}(\kappa_x)] \qquad (27)$$

$$K_{x\kappa} = \frac{k_T\phi}{2R_e}\left(= B_xC_xD_x = \partial F_{xo}/\partial\kappa_x \text{ at } \kappa_x = 0\right)(= C_{F\kappa}) \qquad (28)$$

$$B_x = K_{x\kappa}/(C_xD_x + \varepsilon_x) \qquad (29)$$

Here, $p_{Cx1}$, $p_{Dx1}$, $p_{Dx2}$, $p_{Dx3}$, $p_{Ex1}$, $p_{Ex2}$, $p_{Ex3}$, $p_{Ex4}$, and $\varepsilon_x$ are constants. $\varepsilon_x$ is a sufficiently small value that is set to avoid division by 0 and has no physical meaning.

When a side slip angle is generated (combined slip), the side slip angle contributes to friction force saturation, and therefore, the driving force $F_x$ is expressed by the following formulas 30 to 37.

$$F_x = G_{x\alpha}F_{xo} \qquad (30)$$

$$G_{x\alpha} = \cos\{C_{x\alpha}\tan^{-1}[B_{x\alpha}\alpha_S - E_{x\alpha}(B_{x\alpha}\alpha_S - \tan^{-1}B_{x\alpha}\alpha_S)]\}/G_{x\alpha o}(>0) \qquad (31)$$

$$G_{x\alpha o} = \cos\{C_{x\alpha}\tan^{-1}[B_{x\alpha}S_{Hx\alpha} - E_{x\alpha}(B_{x\alpha}S_{Hx\alpha} - \tan^{-1}B_{x\alpha}S_{Hx\alpha})]\} \qquad (32)$$

$$\alpha_S = \alpha^* + S_{Hx\alpha} \qquad (33)$$

$$B_{x\alpha} = (r_{Bx1} + r_{Bx3}\gamma^{*2})\cos(\tan^{-1}r_{Bx2}\kappa)\cdot\lambda_{x\alpha}(>0) \qquad (34)$$

$$C_{x\alpha} = r_{Cx1} \qquad (35)$$

$$E_{x\alpha} = r_{Ex1} + r_{Ex2}df_z(\leq 1) \qquad (36)$$

$$S_{Hx\alpha} = r_{Hx1} \qquad (37)$$

Here, $r_{Bx1}$, $r_{Bx2}$, $r_{Bx3}$, $\lambda_{x\alpha}$, $r_{Cx1}$, $r_{Ex1}$, and $r_{Ex2}$ are constants.

The wheel speed (the rotation speed of the wheel body or the derivative of $\theta_W$) and the ground speed $V_{cxfl}$ in the longitudinal direction of the driving wheel (left front wheel) are variables for obtaining the slip ratio $\kappa$. The ground speed $V_{cxfl}$ in the longitudinal direction of the driving wheel (left front wheel) is obtained by the following formula based on a ground speed $V_x$ of the position of the center of gravity of the vehicle (vehicle body speed) in the fore and aft direction, a front wheel steering angle $\delta_f$ [deg], and a yaw angular velocity $\gamma$ [deg/s].

$$V_{cxfl} = V_x\cos\delta_f + \left(l\sin\delta_f - \frac{d_f}{2}\cos\delta_f\right)\dot{r} \qquad (38)$$

Here, l is a wheel base [m].

The vehicle body speed $V_x$ is obtained as an integral of a forward-backward acceleration $a_x^*$. The forward-backward acceleration $a_x^*$ may be simply made equal to $a_x$, but if a 6-axis inertial sensor or the like can be used, is preferably set to a value after tilt correction (plane projection).

For the state equation of the formula 15, an observation equation is expressed by the following formula.

$$\begin{bmatrix} y_1 \\ y_2 \\ y_3 \\ y_4 \end{bmatrix} = \begin{bmatrix} 30\dot{\theta}_{DN}/\pi \\ 30\dot{\theta}_W/\pi \\ \lambda_\mu \\ 3.6\,V_{rr}(V_x) \end{bmatrix} \quad (39)$$

$\lambda_\mu$ is a pseudo observation amount of the road surface friction coefficient, and is used when putting a limit on the estimated value of the road surface friction coefficient such that the estimated value of the road surface friction coefficient is greater than or equal to 0 and less than or equal to 1. $\lambda_\mu$ is preferably set to a value greater than or equal to 0 and less than or equal to 1. Preferably, $\lambda\mu$ is set to 0 in a case where the estimated value of the road surface friction coefficient becomes less than 0, and is set to 1 in a case where the estimated value of the road surface friction coefficient becomes greater than 1, for example. $V_{rr}$ is a wheel speed of the rear wheel which is a non-driving wheel. When it is assumed that the rear wheel is not slipping, the rear wheel speed $V_{rr}$ becomes equal to the vehicle body speed $V_x$. The observed value is represented by the following formula 40 based on the wheel speed $V_{Wrl}$ of the left rear wheel and the wheel speed $V_{Wrr}$ of the right rear wheel.

$$y_4 = \frac{V_{Wrl} + V_{Wrr}}{2} \quad (40)$$

The formula 15 is a state equation for the continuous time representation, and the estimation unit 14A executes the calculation in every sampling interval of the observed value $y={}^t(y_1, y_2, y_3, y_4)$. Discrete time representation of the formula 15 and the formula 39 can be expressed by the following formula.

$x(k+1)=f(x(k),u(k))+v(k)$ $y(k)=h(x(k))+w(k) \quad (41)$

Here, k is a discrete time for every sampling interval, y(k) is a four dimension time series, x(k) is a twelve dimension state vector, and u(k) is a twelve dimension system input vector. x(k) and u(k) are expressed by the following formula.

$$x = {}^t(\theta_{DN}, \dot{\theta}_{DN}, \theta_W, \dot{\theta}_W, \theta_T, \dot{\theta}_T, k_T, \lambda_{\mu x}, F_{zfl}, m, \varphi, V_x) \quad (42)$$

$$= {}^t(x_1, x_2, \ldots, x_{12})$$

$$u = {}^t\!\left(0, \frac{T_{DNo}}{I_{DN}}, 0, -\frac{T_{brk}}{I_W}, 0, 0, 0, 0, 0, 0, \frac{\pi N_e}{30} \cdot v, 0\right)$$

$$= {}^t(u_1, u_2, \ldots, u_{12})$$

Also, v(k) is a twelve dimension system noise vector whose mean vector is 0 and covariance matrix is represented by Q, and w(k) is a four dimension observation noise vector whose mean vector is 0 and covariance matrix is represented by R. Assuming that v(k) and w(k) are mutually independent Gaussian white noises, they are expressed by the formula 43.

$E[v(k)]=E[w(k)]=0$ $E[(v(k))^T v(k)]=Q, \ E[(w(k))^T w(k)]=R \quad (43)$ f(x, u) is expressed by a twelve dimension function of the following formula 44 based on the discrete time integration (forward Euler method) of the formula 15. h(x) is a four dimension function represented by the following formula 45. $\Delta t$ is a discrete time interval (sampling interval).

$$f(x,u) = \quad (44)$$

$$x + \begin{bmatrix} x_2 \\ \frac{1}{I_{DN}}[x_{10}\sin x_{11} - k_D(x_1 - x_3)] + u_2 \\ x_4 \\ \frac{1}{I_W}[k_D(x_1 - x_3) - x_7(x_3 - x_5)] + u_4 \\ x_6 \\ \frac{1}{I_T}\left[x_7(x_3 - x_5) - R_e(x_9)\cdot F_x\!\left(x_7, x_8, x_9, x_4, V_{cxfl}, \hat{\alpha}_f, \hat{\gamma}_{fl}\right)\right] \\ 0 \\ 0 \\ -\frac{k_f}{(k_f + k_r)}\frac{h}{d_f}m\dot{a}_y - \frac{h}{2l}m\dot{a}_x \\ 0 \\ u_{11} \\ \hat{a}_x \end{bmatrix} \Delta t$$

$$h(x) = \begin{bmatrix} 30x_2/\pi \\ 30x_4/\pi \\ x_8 \\ 3.6x_{12} \end{bmatrix} \quad (45)$$

In the following, a procedure for calculating a state estimation value x̂(k) (^ represents a hat operator) by using an Extended Kalman Filter (EKF), which is one type of a nonlinear Kalman filter, will be described.

The initial value x̂(0) of the state estimation value x̂(k) (^ represents a hat operator) is assumed to be a Gaussian probability vector following $N(x_0, \Sigma 0)$, and is represented by the following formula 46.

$\hat{x}(0)=E[x(0)]=x_0$ $P(0)=E[(x(0)-E[x(0)])(x(0)-E[x(0)])^T]=\Sigma_0 \quad (46)$ For k=1, 2, . . . , the prior state estimate x̂⁻(k) is expressed by the following formula 47.

$\hat{x}^-(k)=f(\hat{x}(k-1),u(k-1)) \quad (47)$

Provided that the formula 48 and the formula 49 are derived by linear approximation, a prior error covariance matrix is obtained as shown by the formula 50.

$$A(k-1) = \left.\frac{\partial f(x,u)}{\partial x}\right|_{x=\hat{x}(k-1),u=u(k-1)} \quad (48)$$

$$C^T(k) = \left.\frac{\partial h(x)}{\partial x}\right|_{x=\hat{x}^-(k)} \quad (49)$$

$$= \begin{bmatrix} 0 & \frac{30}{\pi} & 0 & 0 & 0 & 0 & 0 & 0 & 0 & 0 & 0 & 0 \\ 0 & 0 & 0 & \frac{30}{\pi} & 0 & 0 & 0 & 0 & 0 & 0 & 0 & 0 \\ 0 & 0 & 0 & 0 & 0 & 0 & 0 & 1 & 0 & 0 & 0 & 0 \\ 0 & 0 & 0 & 0 & 0 & 0 & 0 & 0 & 0 & 0 & 0 & 3.6 \end{bmatrix}$$

$P^-(k) = A(k-1)P(k-1)A^T(k-1) + Q \quad (50)$

Accordingly, the Kalman gain matrix G(k) can be expressed by the following formula 51.

$G(k)=P^-(k)C(k)(C^T(k)P^-(k)C(k)+R(k))^{-1} \quad (51)$

The state estimation value x^(k) (^ represents a hat operator) is expressed by the following formula 52.

$$\hat{x}(k) = \bar{x}^-(k) + G(k)[y(k) - h(\hat{x}^-(k))] \quad (52)$$

The posterior error covariance matrix P(k) is expressed by the following formula 53.

$$P(k) = (I - G(k)C^T(k))P^-(k) \quad (53)$$

From the foregoing, the state estimation value x^(k) (formula 52) is obtained, whereby the estimated value $\hat{k}_T$ of the tire torsional stiffness is obtained as the seventh element of x^(k) and the estimated value $\hat{\lambda}_{\mu x}$ of the road surface friction coefficient is obtained as the eighth element of x^(k). In the method using a Kalman filter, it is unnecessary to explicitly obtain the amplitude and phase by frequency analysis, and application is easy even in the transient state.

$$\hat{x}(k) = {}^t\left(\hat{\theta}_{DN}, \hat{\dot{\theta}}_{DN}, \hat{\theta}_W, \hat{\dot{\theta}}_W, \hat{\theta}_T, \hat{\dot{\theta}}_T, \hat{k}_T, \hat{\lambda}_{\mu x}, \hat{F}_{zfl}, \hat{m}, \hat{\varphi}, \hat{V}_x\right) \quad (54)$$

An estimated vehicle body speed $\hat{V}_x$ is obtained as a weighted average of a first speed acquired by the rear wheel speed sensor 12B and a second speed acquired by integrating the forward-backward acceleration acquired by the acceleration sensor 12D. Also, the weights are set based on the Kalman gain such that the likelihood of the state quantity x(k) is maximized.

By reflecting the tire parameters included in the state estimation value x'(k) in the tire model, the friction damping coefficient $c_T$ ([Nm (rad/s)]) between the tire and the road surface can be represented by the following formula 55.

$$c_T(k_T, \lambda_{\mu x}, F_z, \theta_W, V_{cx}, \gamma) = \frac{dT_x}{d\dot{\theta}_s} = \quad (55)$$

$$\frac{R_e^2}{V_{cx}} \cdot \frac{dF_x}{d\kappa} = \frac{R_e^2}{V_{cx}} \cdot \frac{C_x D_x \cos\left[C_x \tan^{-1} B_x \kappa_x - E_x\left(B_x \kappa_x - \tan^{-1} B_x \kappa_x\right)\right]}{1 + \left[B_x \kappa_x - E_x\left(B_x \kappa_x - \tan^{-1} B_x \kappa_x\right)\right]^2} \times$$

$$\left(B_x - \frac{E_x B_x^3 \kappa_x^2}{1 + B_x^2 \kappa_x^2}\right)$$

Here, $\kappa_x$, $B_x$, $C_x$, $D_x$, $E_x$ are expressed by the following formula 56.

$$\kappa_x(\theta_W, V_{cx}) = -\frac{V_{cx} - V_{cx} - R_e \dot{\theta}_W}{|V_{cx}|} \quad (56)$$

$$B_x(k_T, \lambda_{\mu x}, F_z, \gamma) = \frac{k_T \phi}{2R_e(C_x D_x + \varepsilon_x)}$$

$$C_x = p_{Cx1}$$

$$D_x(\lambda_{\mu x}, F_z, \gamma) = (p_{Dx1} + p_{Dx2} df_z)(1 - p_{Dx3}\gamma^2)\lambda_{\mu x} F_z$$

$$E_x(F_z, \theta_W, V_{cx}) = (p_{Ex1} + p_{Ex2} df_z + p_{Ex3} df_z^2)[1 - p_{Ex4}\text{sgn}(\kappa_x)]$$

$$df_z = \frac{F_z - F_{zo}}{F_{zo}}$$

Here, $p_{Cx1}$, $p_{Dx1}$, $p_{Dx2}$, $p_{Dx3}$, $p_{Ex1}$, $p_{Ex2}$, $p_{Ex3}$, and $p_{Ex4}$ are constants.

On the other hand, as described above, once the dimensionless quantity $\zeta_C$ is known, the friction damping coefficient $c_{Tc}$ when the slip state becomes the adhesion limit can be acquired from the formula 8. When the slip state becomes the adhesion limit, the slip ratio $\kappa_x$ in the formula 55 is denoted by $\kappa_c$ and the friction damping coefficient $c_T$ represented by the formula 55 is equal to the friction damping coefficient $c_{Tc}$ when the slip state becomes the adhesion limit, which is obtained from the dimensionless quantity $\zeta_C$, and therefore, the relationship of the following formula 57 is obtained.

$$c_T(\kappa_c) = \frac{R_e^2}{V_{cx}} \cdot \frac{C_x D_x \cos\left[C_x \tan^{-1} B_x \kappa_c - E_x\left(B_x \kappa_c - \tan^{-1} B_x \kappa_c\right)\right]}{1 + \left[B_x \kappa_c - E_x\left(B_x \kappa_c - \tan^{-1} B_x \kappa_c\right)\right]^2} \times \quad (57)$$

$$\left(B_x - \frac{E_x B_x^3 \kappa_c^2}{1 + B_x^2 \kappa_c^2}\right)$$

$$= \zeta_C \sqrt{I_W k_T} \, (= c_{Tc})$$

Figure 6:
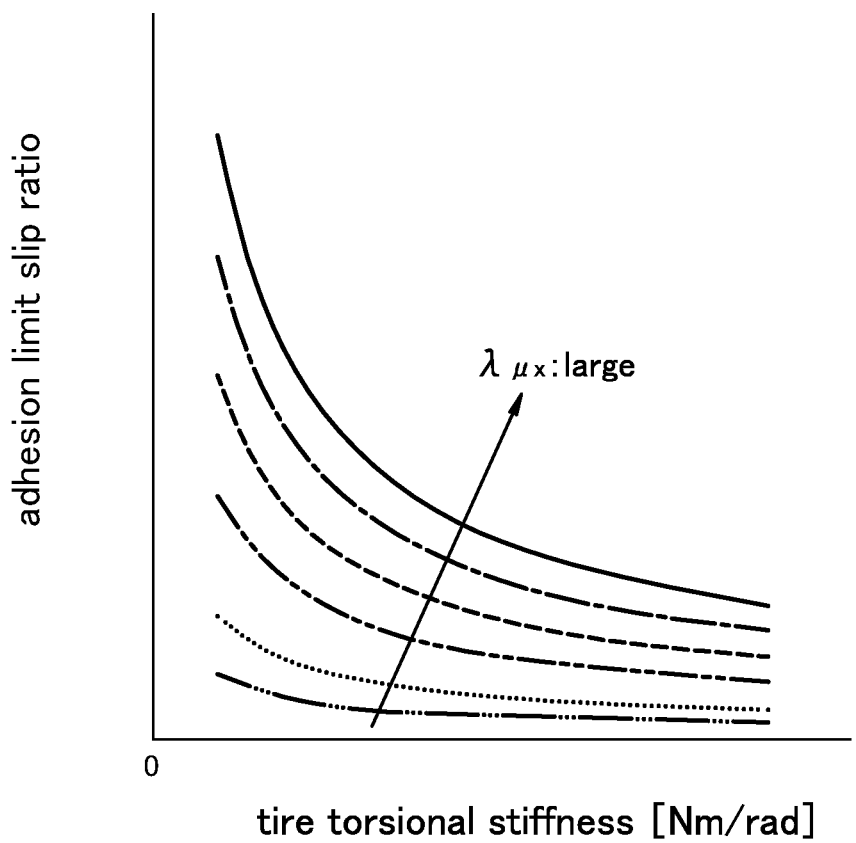
FIG. 6 is a map showing a relationship between a tire torsional stiffness, a road surface friction coefficient, and an adhesion limit slip ratio.

From this formula, it is possible to acquire the adhesion limit slip ratio $\kappa_c$ which is the slip ratio when the slip state becomes the adhesion limit. Preferably, the adhesion limit slip ratio is numerically calculated offline beforehand to be mapped. For example, the adhesion limit slip ratio may be preferably set based on the tire torsional stiffness $k_T$ and the road surface friction coefficient $\lambda_{\mu x}$ by using the map shown in FIG. 6.

Once the adhesion limit slip ratio is determined, based on the tire model represented by the formula 22 to the formula 37, an adhesion limit driving force $F_{cx}$ which is the driving force of the tire corresponding to the adhesion limit $F_x$ is determined. The adhesion limit driving force $F_{xc}$ may be converted to an adhesion limit torque $T_{xc}$ which is a driving torque $T_{xc}$ of the tire corresponding to the adhesion limit. The estimation unit 14A may set the adhesion limit driving force $F_{xc}$ according to the tire torsional stiffness $k_T$ and the road surface friction coefficient $\lambda_{\mu x}$ by using the map representing the relationship of the adhesion limit driving force $F_{xc}$ (or the adhesion limit torque $T_{xc}$) with the tire torsional stiffness $k_T$ and the road surface friction coefficient $\lambda_{\mu x}$.

Figure 7:
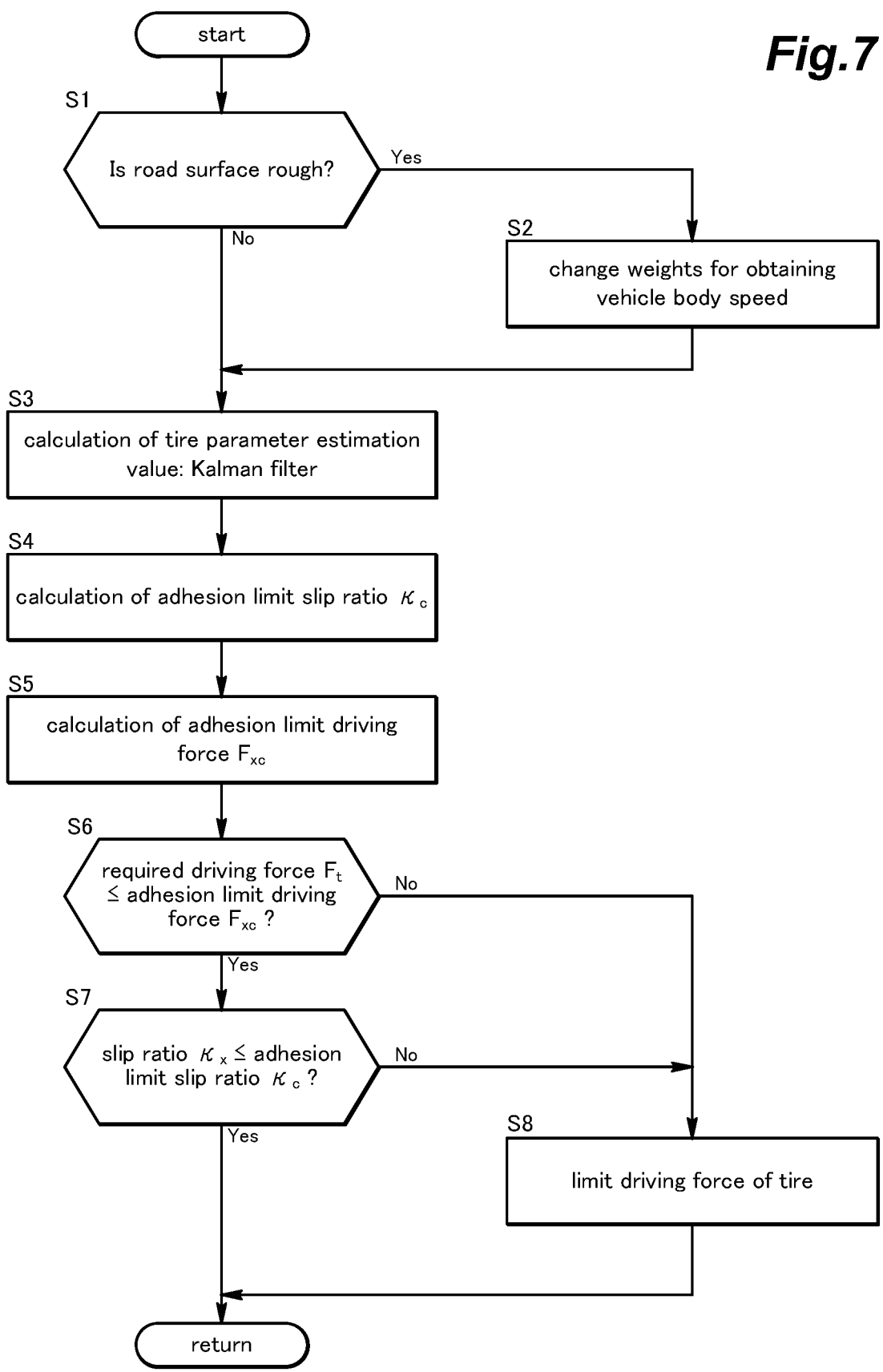
FIG. 7 is a flowchart showing a procedure of a travel control method executed by a control device.

Next, with reference to FIG. 7, the control procedure executed by the control device 14 will be described. The control device 14 executes the procedure shown in FIG. 7 at every prescribed time interval.

First, the estimation unit 14A determines whether the road surface on which the vehicle 1 is traveling is rough (S1). In the present embodiment, the estimation unit 14A acquires the vertical acceleration of the vehicle body 2 based on the signal from the vertical acceleration sensor provided on the vehicle body 2 and determines whether or not the absolute value of the vertical acceleration is less than or equal to a prescribed determination value. The estimation unit 14A determines that the road surface is rough when the absolute value of the vertical acceleration is greater than the determination value. In another embodiment, the estimation unit 14A may determine whether the road surface is rough based on the road surface image captured by a camera instead of performing the rough road determination based on the vertical acceleration. Also, the estimation unit 14A may detect, with a stroke sensor, a vertical stroke of the wheel 3 relative to the vehicle body 2 and determine whether the road surface is rough based on the amount of change and/or the speed of change of the vertical stroke.

When the road surface is rough (the determination result in S1 is Yes), the estimation unit 14A reduces the influence of the rear wheel speed, which is the non-driving wheel speed, when obtaining the vehicle body speed $V_x$ (the fore-and-aft ground speed of the center of gravity of the vehicle). As described above, the vehicle body speed $V_x$ is acquired as a weighted average of the rear wheel speed acquired by the rear wheel speed sensor 12B and the integral of the forward-backward acceleration acquired by the acceleration sensor 12D. When the rear wheel 3R is not slipping relative to the road surface, the rear wheel speed matches the vehicle body speed. However, when the road surface is rough, a rotation fluctuation occurs in the non-driving wheel due to irregularities of the road surface and, since the timing at which the irregularities are passed differs between the driving wheel and the non-driving wheel, this rotation fluctuation becomes observation noise in obtaining the vehicle body speed. To reduce the error due to this observation noise, when the road surface is rough, the estimation unit 14A reduces the influence of the rear wheel speed on the vehicle body speed $V_x$. In the present embodiment, in step S2, the estimation unit 14A changes the parameter in the fourth row of the fourth column in the covariance matrix R for the observation error to a value corresponding to the rough road. Thereby, the amount of correction of the vehicle body speed $V_x$ based on the rear wheel speed, which is an observed value, is reduced.

When the determination result in step S1 is No or after executing the process of step S2, the estimation unit 14A acquires the state estimation value x^(k) including the tire parameters by using the above-described Kalman filter (S3). The estimation unit 14A inputs, to the Kalman filter, the rotation speed of the final gear of the differential device DN acquired by the drive source rotation speed sensor 12C, the rotation speed of the wheel body W acquired by the front wheel speed sensor 12A, the forward-backward acceleration acquired by the acceleration sensor 12D, the engine rotation speed acquired by the engine rotation speed sensor 12H, the engine torque acquired by the torque acquisition unit 14C, and the braking torque of the wheel body W, and acquires the state estimation value x^(k) as an output of the Kalman filter.

Subsequently, based on the tire torsional stiffness $k_T$ and the road surface friction coefficient $\lambda_{\mu x}$ included in the state estimation value x^(k), the estimation unit 14A sets the adhesion limit slip ratio Kc which is the slip ratio $\kappa_x$ corresponding to the adhesion limit (S4). As described above, the estimation unit 14A preferably sets the adhesion limit slip ratio Kc based on the tire torsional stiffness $k_T$ and the road surface friction coefficient $\lambda_{\mu x}$ by using the map shown in FIG. 6.

Then, based on the adhesion limit slip ratio Kc, the estimation unit 14A sets the adhesion limit driving force $F_{xc}$ which is the driving force of the tire corresponding to the adhesion limit $F_x$ (S5). As described above, the estimation unit 14A preferably sets the adhesion limit driving force $F_{xc}$ based on the adhesion limit slip ratio $\kappa_C$ by using the tire model represented by the formula 22 to the formula 37. The estimation unit 14A may set the adhesion limit driving force $F_{xc}$ based on the map depicting the relationship between the adhesion limit slip ratio Kc and the adhesion limit driving force $F_{xc}$. In another embodiment, the estimation unit 14A may set the adhesion limit driving force $F_{xc}$ based on the tire torsional stiffness $k_T$ and the road surface friction coefficient $\lambda_{\mu x}$ instead of steps S4 and S5.

Subsequently, the control unit 14B determines whether or not the required driving force $F_t$ of the drive source 5 is less than or equal to the adhesion limit driving force Fxc (S6). Preferably, the control unit 14B acquires the operation amount of the accelerator pedal 11B based on the signal from the accelerator pedal sensor 12F and sets the required driving force $F_t$ of the drive source 5 based on the operation amount of the accelerator pedal 11B. Also, the control unit 14B may set the required driving force Ft based on the rotation speed of the internal combustion engine 5A in addition to the operation amount of the accelerator pedal 11B.

When the required driving force $F_t$ is less than or equal to the adhesion limit driving force $F_{xc}$ (the determination result in step S6 is Yes), the control unit 14B determines whether or not the slip ratio $\kappa_x$ is less than or equal to the adhesion limit slip ratio $\kappa_C$ (S7).

When the determination result in step S6 is No or when the determination result in step S7 is No, the control unit 14B limits the output of the internal combustion engine 5A or activates the braking device 8 such that the driving force $F_x$ of the tire T becomes less than or equal to the adhesion limit driving force $F_{xc}$ and the slip ratio $\kappa_x$ becomes less than or equal to the adhesion limit slip ratio $\kappa_C$ (S8). The control unit 14B may make the driving force $F_x$ of the tire T less than or equal to the adhesion limit driving force $F_{xc}$ or make the slip ratio $\kappa_x$ less than or equal to the adhesion limit slip ratio $\kappa_C$ by limiting the required driving force to less than or equal to a prescribed threshold value, for example. Also, the control unit 14B may make the driving force $F_x$ of the tire T less than or equal to the adhesion limit driving force $F_{xc}$ or make the slip ratio $\kappa_x$ less than or equal to the adhesion limit slip ratio $\kappa_C$ by limiting the output of the internal combustion engine 5A to less than or equal to a prescribed threshold value.

In the foregoing embodiment, the estimation unit 14A estimates the tire torsional stiffness and the road surface friction coefficient based on the mode and, based on the tire torsional stiffness and the road surface friction coefficient that have been estimated, estimates the adhesion limit driving force. Since the estimation unit 14A estimates the adhesion limit driving force based on the dynamic model from the drive source 5 to the tire contact surface configured by the differential device DN, the wheel body W, and the tire T, the estimation is hard to be affected by the variation and/or deterioration of the components. Also, since the estimation unit 14A estimates the adhesion limit driving force based on the tire torsional stiffness and the road surface friction coefficient, the estimation is hard to be affected by the use case such as the number of occupants and the amount of carried load. In addition, since the control unit 14B controls the driving force $F_x$ of the tire T based on the adhesion limit driving force, the tire T can be properly maintained in the elastic slip state.

Figure 8:
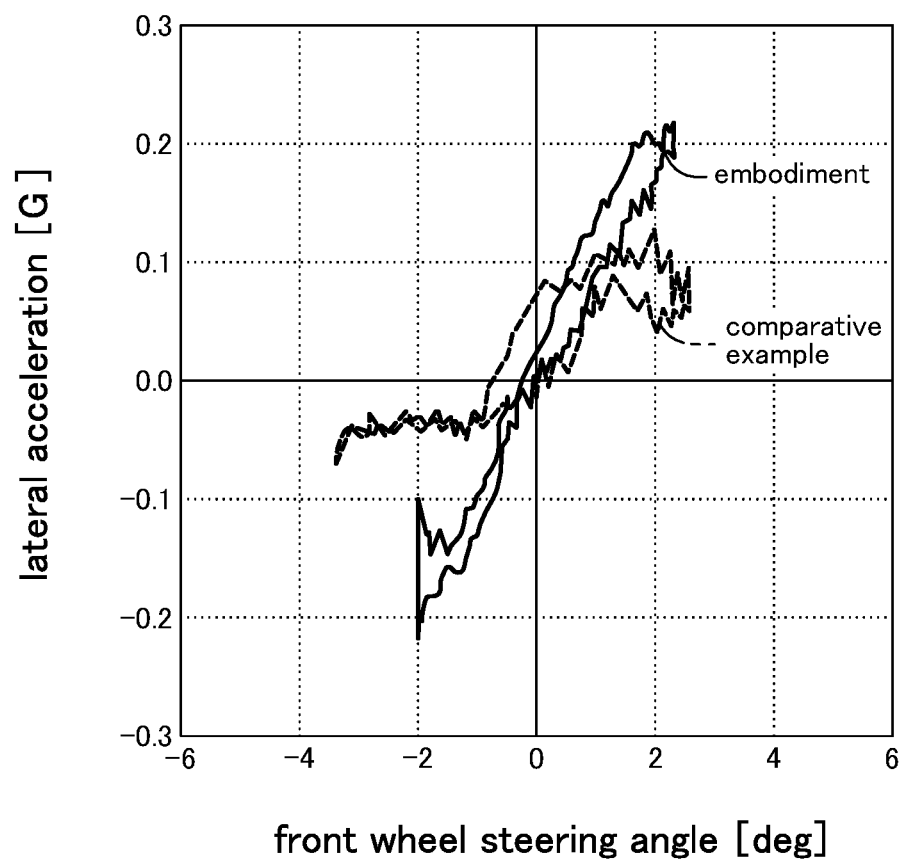
FIG. 8 is graph showing a lateral acceleration with respect to a front wheel steering angle in the embodiment and in a comparative example.

The control unit 14B maintains the driving force $F_x$ of the tire T less than or equal to the adhesion limit driving force $F_{xc}$ by controlling at least one of the drive source 5 and the braking device 8. As a result, the tire T is maintained in the elastic slip state. Thereby, as shown in the embodiment of FIG. 8, even when the steering angle is large, the tire T is maintained in the elastic slip state, and it is possible to generate a lateral acceleration corresponding to the steering angle. On the other hand, in a comparative example in which the control to maintain the driving force $F_x$ of the tire T less than or equal to the adhesion limit driving force $F_{xc}$ is not conducted, as the steering angle increases, the slip ratio increases and the rate of increase of the lateral acceleration relative to the steering angle decreases. Thereby, as shown in FIG. 9, in the embodiment the travel path of the vehicle can be made closer to the theoretical path which is determined by the steering angle compared to the comparative example.

Because the control method executed by the control device 14 to maintain the driving force $F_x$ of the tire T less than or equal to the adhesion limit driving force $F_{xc}$ maintains the slip ratio low, loss of energy can be reduced. Thereby, fuel economy can be improved.

Also, since the tire T is deterred from becoming the sliding slip state, the vehicle behavior caused by steering does not considerably change depending on the road surface, and thus, the occupant can get a sense of security about the behavior of the vehicle 1.

Since the estimation unit 14A estimates the tire torsional stiffness based on the dynamic model from the drive source 5 to the tire and the tire model, the travel control system 10 does not need an additional sensor for directly acquiring the state of the tire T such as a strain sensor for the tire T or the like.

The control unit 14B limits the required driving force $F_t$ of the drive source 5 to less than or equal to the adhesion limit driving force $F_{xc}$. Due to this aspect, the tire can be maintained in the elastic slip state. Since the required driving force attributed to the driver's operation and/or the vehicle control is restricted, the vehicle behavior is deterred from rapidly changing. Also, the control is relatively easy.

Concrete embodiments have been described in the foregoing, but the present invention is not limited to the above embodiments and may be modified or altered in various ways. For example, as the control procedure executed by the control device 14, description was made of the acceleration-side procedure that sets the required driving force Ft of the drive source 5 based on the operation amount of the accelerator pedal 11B but the control procedure executed by the control device 14 may be a deceleration-side procedure that sets the required driving force $F_t$ by the brake pedal. On the deceleration side, the driving force $F_x$ and the slip ratio $\kappa_x$ are defined by negative values, and therefore, at least one of the drive source 5 and the braking device 8 should be controlled such that the absolute values of the driving force $F_x$ and the slip ratio $\kappa_x$ do not exceed the adhesion limit driving force $F_{xc}$ and the adhesion limit slip ratio $\kappa_C$, respectively. In this case, the drive source 5 controls the engine brake (in the case of the electric motor, regeneration) and the braking device 8 controls the braking torque, whereby the tire can be maintained in the elastic slip state on the deceleration side also.

The invention claimed is:

1. A travel control system for a vehicle provided with a drive source, a wheel having a wheel body connected to the drive source via a power transmission member and a tire mounted on the wheel body, and a braking device for braking the wheel, the system comprising:
    a first rotation sensor configured to acquire a rotation speed of the drive source;
    a second rotation sensor configured to acquire a rotation speed of the wheel body;
    a vehicle body speed acquisition unit configured to acquire information related to a vehicle body speed;
    a torque acquisition unit configured to acquire a torque applied to the wheel body;
    an estimation unit configured to estimate a tire torsional stiffness, which is a stiffness of the tire, and a road surface friction coefficient, which is a friction property between the tire and a road surface, based on at least the rotation speed of the drive source, the rotation speed of the wheel body, the vehicle body speed, and the torque applied to the wheel body, and estimate an adhesion limit driving force corresponding to an adhesion limit of the tire based on the tire torsional stiffness and the road surface friction coefficient by using a map with pre-defined relationships for the adhesion limit driving force, the tire torsional stiffness, and the road surface friction coefficient; and
    a control unit configured to control at least one of the drive source and the braking device such that an absolute value of the driving force of the tire does not exceed the adhesion limit driving force,
    wherein the vehicle body speed acquisition unit comprises a non-driving wheel rotation sensor configured to acquire a rotation speed of a non-driving wheel and an acceleration sensor configured to acquire a forward-backward acceleration of the vehicle,
    the estimation unit estimates the vehicle body speed by using a weighted average of a first speed acquired by the non-driving wheel rotation sensor and a second speed acquired by integrating the forward-backward acceleration acquired by the acceleration sensor, and changes weights of the weighted average to maximize a likelihood of a state quantity estimated by the estimation unit, and
    the estimation unit determines whether the road surface is rough by comparing a vertical acceleration of the vehicle body to a determination value, and when it is determined that the road surface is rough, changes the weights to reduce influence of the first speed on the vehicle body speed.

2. The travel control system according to claim 1, wherein the estimation unit predicts a wheel load based on a forward-backward acceleration and a lateral acceleration and decides the wheel load to maximize a likelihood of a state quantity value of at least one of the wheel load, the tire torsional stiffness, and the road surface friction coefficient.

3. The travel control system according to claim 1, wherein the estimation unit calculates an adhesion limit slip ratio corresponding to the adhesion limit of the tire for the road surface based on the tire torsional stiffness and the road surface friction coefficient, and
    the control unit controls at least one of the drive source and the braking device such that an absolute value of a slip ratio of the tire is less than or equal to the adhesion limit slip ratio.

4. The travel control system according to claim 1, wherein the estimation unit determines whether the road surface is rough based on the road surface image captured by a camera, and when it is determined that the road surface is rough, changes the weights to reduce influence of the first speed on the vehicle body speed.

5. The travel control system according to claim 1, wherein the estimation unit determines whether the road surface is rough based on a vertical stroke determined by a stroke sensor, and when it is determined that the road surface is rough, changes the weights to reduce influence of the first speed on the vehicle body speed.

* * * * *